(12) United States Patent
Agnich et al.

(10) Patent No.: US 10,540,355 B1
(45) Date of Patent: Jan. 21, 2020

(54) ACID DATABASE

(71) Applicant: Terrain Data, Inc., Palo Alto, CA (US)

(72) Inventors: Michael McCord Agnich, Menlo Park, CA (US); Charles Edison Tripp, Denver, CO (US); Nathaniel Smith, Menlo Park, CA (US); Benjamin Smith, Menlo Park, CA (US)

(73) Assignee: Terrain Data, Inc., Palo Alto, CA (US)

( * ) Notice: Subject to any disclaimer, the term of this patent is extended or adjusted under 35 U.S.C. 154(b) by 645 days.

(21) Appl. No.: 15/187,609

(22) Filed: Jun. 20, 2016

Related U.S. Application Data

(60) Provisional application No. 62/181,622, filed on Jun. 18, 2015.

(51) Int. Cl.
*G06F 16/2453* (2019.01)
*G06F 16/25* (2019.01)
*G06F 16/28* (2019.01)
*G06F 16/22* (2019.01)
*G06F 16/23* (2019.01)
*G06F 16/2455* (2019.01)

(52) U.S. Cl.
CPC .... *G06F 16/24547* (2019.01); *G06F 16/2246* (2019.01); *G06F 16/2365* (2019.01); *G06F 16/2455* (2019.01); *G06F 16/24542* (2019.01); *G06F 16/25* (2019.01); *G06F 16/284* (2019.01)

(58) Field of Classification Search
CPC ................................................ G06F 16/24547
See application file for complete search history.

(56) References Cited

U.S. PATENT DOCUMENTS 6,151,607 A * 11/2000 Lomet ................. G06F 11/1471
9,519,664 B1 * 12/2016 Kharatishvili ........ G06F 16/316

* cited by examiner

*Primary Examiner* — Van H Oberly
(74) *Attorney, Agent, or Firm* — Baker Botts L.L.P.

(57) ABSTRACT

In one embodiment, a method for minimizing latency of a query load on a database system by accessing data using an adaptive B-tree index structure comprising a plurality of nodes includes determining one or more characteristics of the query load that are associated with one or more queries received by the database system, determining, for each of the plurality of nodes of the adaptive B-tree index structure, whether to convert the node to a read-optimized node or a write-optimized node based on the one or more characteristics of the query load, and converting at least one of the plurality of nodes to a read-optimized node or a write-optimized node based on the one or more characteristics of the query load.

18 Claims, 16 Drawing Sheets

FIG. 10

ACID DATABASE

PRIORITY

This application claims the benefit, under 35 U.S.C. § 119(e), of U.S. Provisional Patent Application No. 62/181,622, filed 18 Jun. 2015, which is incorporated herein by reference.

TECHNICAL FIELD

This disclosure generally relates to increasing efficiency in database management.

BACKGROUND

Historically, achieving a database system has required many different data systems placed in parallel and in series. For example, a typical database system for an online-commerce application may have a generic database for financial transactions and a separate application-specific system for conducting search queries and providing lists of search results. The search query may be processed with a separate "relevance" framework that uses the Apache Solr search platform, Elasticsearch search and analytics platform, or other Apache Lucene project. In addition or as an alternative, the search query may be processed with a separate "quality" framework that uses Apache Hadoop or one or more custom search-quality indexers. Once a set of search results is generated (which might be a list of identifiers (IDs) of content stored in the generic database or at another location), the search results may be processed by middleware before being stored in a cache to be sent to application or web servers that package the content and present it in a user-friendly user interface.

SUMMARY OF PARTICULAR EMBODIMENTS

In particular embodiments, a method for minimizing latency of a query load on a database system by accessing data using an adaptive B-tree index structure comprising a plurality of nodes includes determining one or more characteristics of the query load that are associated with one or more queries received by the database system, determining, for each of the plurality of nodes of the adaptive B-tree index structure, whether to convert the node to a read-optimized node or a write-optimized node based on the one or more characteristics of the query load, and converting at least one of the plurality of nodes to a read-optimized node or a write-optimized node based on the one or more characteristics of the query load.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 7-15 illustrate example user interfaces for an a particular embodiment employing search and recommendation algorithms.

DESCRIPTION OF EXAMPLE EMBODIMENTS

Database System Overview

Figure 1:
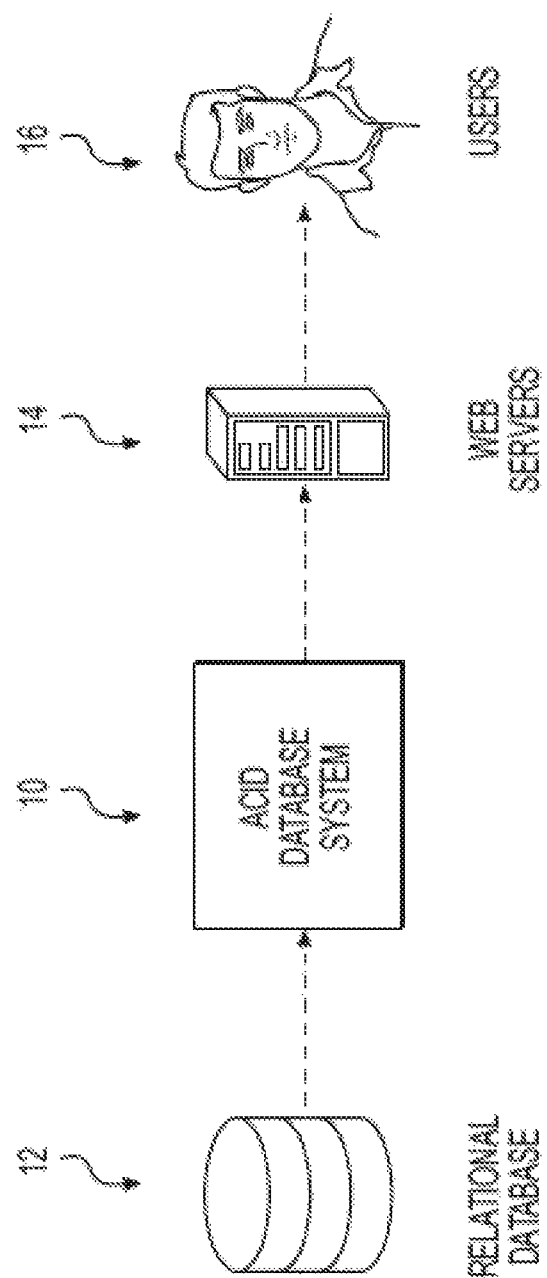
FIG. 1 illustrates an example ACID database.

Particular embodiments described below provide a low latency, durable, distributed, and ACID (Atomicity, Consistency, Isolation, Durability) database system 10 in a single system that may reside between a relational database 12 and one or more web servers 14, as FIG. 1 illustrates. In the example of FIG. 1, ACID database system 10 may access, process, and sort data in relational database 12 in response to a search query. The data may then be sent to web servers 14 and presented to one or more users 16.

Figure 2:
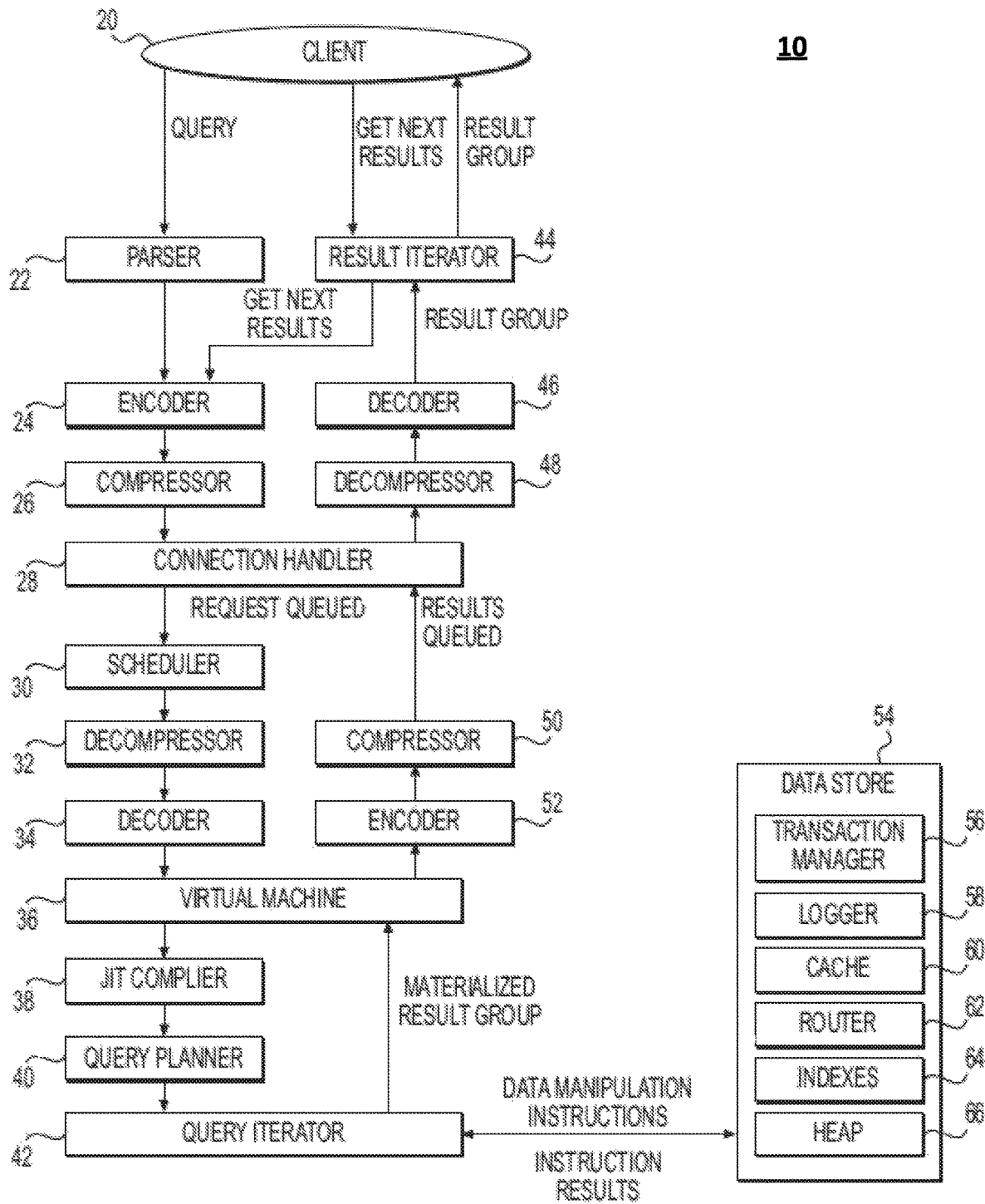
FIG. 2 illustrates an example social graph.

FIG. 2 illustrates example components of ACID database system 10. ACID database system 10 receives search queries and selects, sorts, and presents search results using a streaming-data protocol that compactly and efficiently encodes and decodes search queries, search results, and input data using bytecode that functions as an instruction set for a virtual machine (as described below). In contrast, prior database systems typically use text, the Hessian binary web service protocol, protocol buffers, JavaScript Object Notation (JSON), or Binary JSON (BSON). In particular embodiments, the streaming-data protocol may include an adaptable query language designed to allow efficient linear-time parsing into the bytecode described above. A particular embodiment of the query language (which may be referred to as Terrain Query Language (TQL)) is described more fully in Exhibit A, attached, entitled "The TQL Programming Language."

In the example of FIG. 2, a client 20 may send a query to a client library, which may include a parser 22, encoder 24, compressor 26, decompressor 48, decoder 46, and result iterator 44. The query may be run through parser 22, which may parse the text of the query and turn the text into corresponding bytecode. Blocks of this bytecode may then be run through encoder 24 to be encoded according to the streaming-data protocol described above. The blocks of encoded bytecode may then be compressed by compressor 26 using a compression algorithm and each block of the compressed bytecode may be sent to a server by connection handler 28, which may be associated with client 20.

In particular embodiments, connection handler 28 of client 20 may send the blocks of compressed bytecode (e.g., through one or more web servers 14) to a connection handler of a server. The server may be associated with ACID database system 10, and the connection handler associated with the server may be similar to connection handler 28 of client 20. As the connection handler of the server receives the blocks of compressed bytecode, the blocks of compressed bytecode are queued in a scheduler 30 as a new request and periodically scheduler 30 may check the queue and process several new requests. In particular embodiments, scheduler 30 may schedule when one or more of the blocks of compressed bytecode are executed, determine which blocks of compressed bytecode to process at any given time, and at different stages of execution pause them so that other higher-priority inquiries are executed. In particular embodiments, scheduler 30 may manage and allocate database resources, including CPU time, RAM usage, network input/output, and disk input/output. In particular embodiments, scheduler 30 allocates resources by determining when one or more blocks of compressed bytecode may be executed and on what set of processors or disks. In particular embodiments, scheduler 30 may use a cooperative multitasking approach which: uses a hybrid of a fork-join and co-routine-based approach to task scheduling and isolation; schedules tasks based on priority, historical resource utilization, predicted resource utilization, and other factors; schedules tasks to meet specific trade-offs between query priorities, latencies, and overall system throughput; and uses lock-free queues and asynchronous input/out to dispatch and receive network and disk operations. In contrast, prior database systems typically use a process-per-connection model and rely on the operating system to schedule each thread. In these embodiments, the operating system may not have all the information about query priority and complexity and cannot optimize the scheduling as efficiently as the example embodiment described above. In addition, prior database systems may also include schedulers that include the reactor and proactor models.

In particular embodiments, when the blocks of compressed bytecode start to execute (as determined by scheduler 30), the first step is to decompress the compressed block of bytecode by a decompressor 32 to decode the decompressed bytecode from encoded bytecode into usable, decoded bytecode by a decoder 34. In particular embodiments, the decoded bytecode may then be executed by a virtual machine 36, which optimizes and executes requests on the database by performing transformations on the bytecode. These transformations may optimize efficiency of execution of the bytecode by converting sections of bytecode to native instructions assembly, rearranging different structures of the bytecode, eliminating duplicate or unnecessary instructions, etc. In particular embodiments, a type of stack-based virtual machine is used that works in conjunction with a query planner (e.g., query planner 40, described below) to execute bytecode and produce their results. In particular embodiments, virtual machine 36 may operate directly on the bytecode that is received from client 20. In contrast, prior database systems may parse text queries in the database, generate an abstract syntax tree, and then execute one or more optimization passes on the abstract syntax tree to produce a query plan.

In particular embodiments, the transformed bytecode is compiled by a compiler (e.g., a just-in-time (JIT) compiler 30) to transform the bytecode into an executable program, and then fed through a query planner 40. In particular embodiments, query planner 40 may examine the structure of certain parts of the executable program for accessing data from a database (e.g., a data store 54) and transform a query from the executable program into a form that increases efficiency by using indexes in the database. For example, a query for the ten highest priced products might be planned to simply read the first ten entries in an index of products sorted by price, instead of scanning through all products to find the ten most expensive. In addition, the query planner may make plans that use more than one index. For example, a query to find the ten most recent reviews for each of the ten most expensive products may be transformed to first read the ten top entries from an index of products sorted by price and then query an index of reviews sorted by product id and then by date to get the ten most recent reviews for each product's ID. The optimized (or planned) query may include rewritten bytecode, a particular sequence (e.g. tree or graph) of database operations, or a combination thereof.

In particular embodiments, the resultant query from query planner 40 is then encapsulated in a query iterator 42, which can be called to iterate through the results of the query. These results may be materialized by sending data manipulation instructions to one or more data stores 54. These instructions may cause data stores 54 to scan through the data in data store 54 and retrieve/materialize results based on the instructions based on the bytecode to send back to client 20. In particular embodiments, when sending results back to the client, query iterator 42 may only return the first few results, and then when the client requests additional results, it may then materialize them by reading additional data from the database. For example, for a small query, query iterator 42 may send all results in one request. However, for a large query (e.g., hundreds, thousands, or more of data items) query iterator 42 may retrieve only a few hundred at a time so that the database will not need to buffer up and process all the results, which improves efficiency of the system (e.g., if the client determines that it does not need all the results). In particular embodiments, query iterator 42 may retrieve data by accessing data store 54 using select data manipulation instructions (e.g., keep data based on index scan of a particular index based on a particular predicate, such as scanning a product index with the predicate rating greater than three and creation data greater than some predetermined date, and return only data on these products).

In particular embodiments, data store 54 may be a database that processes select queries of data (e.g., blocks of bytecode). In particular embodiments, data store 54 may comprise a transaction manager 56, a logger 58, a cache 60, a router 52, one or more indexes 64, and a heap 66. In particular embodiments, data store 54 may reside on the same server (e.g., be "embedded" within the same server) as connection handler 28, or may be on a different server running at the same time and in communication with connection handler 28 through router 52 (e.g., by its own communication handler). In addition, in particular embodiments, a database memory manager allocates and frees blocks of memory as requested by the database and ensures that memory is not overwritten while still in use. In particular embodiments, the database memory manager may be a type of Deferred Reference Counter which uses a modified Static Tree Barrier to coordinate collection phases and work distribution. In contrast, in prior database systems, garbage collectors may do this work but may be prone to unpredictable and expensive pauses.

In particular embodiments, transaction manager 56 may maintain atomicity and transaction isolation. For example, during a transaction when data is read, transaction manager 56 maintains the reading of data in a consistent state and confirms that data is consistently available to other transactions (e.g., by either being completely visible or completely not visible). In addition, transaction manager 56 maintains the ACID properties of the database.

In particular embodiments, logger 58 may maintain consistency of the data of data store 54 in case of a crash of the system or general data corruption. For example, as data is written updated in the data store, if data store 54 crashes (e.g., while the data is being written to the disk), data store 54 may be restarted and data recovered from a prior consistent state of data store 54, thus allowing data store 54 to recover in the case of crash or data corruption.

In particular embodiments, cache 60 may store all data read from the disk or from the network, in addition to intermediate results from complex queries and materialized values. In other words, cache 60 may store anything and everything that may be useful to keep around because it may be reused at some point in time in the future, including both computed values and also data read from disk. Many databases have internal caches which store data in system memory in order to avoid expensive and slower reads from disk. Particular embodiments use a compacting slab cache which stores data in compact slabs similar to what is used in a copying compacting garbage collector. This stored data may comprise entire disk blocks (heap or index data), fragments of disk blocks, single objects or index entries, materialized intermediate results, usage statistics, compiled queries, query plans, or other data used for producing results or managing the database. In contrast, prior database systems typically cache entire disk blocks in-situ, without compaction, materialization, or extraction.

In particular embodiments, a cache cleaner may be combined with or separate from cache 60. In particular embodiments, the cache cleaner may choose what data to evict from cache 60 in order to free space. Particular embodiments may use usage statistics to choose what cached elements to evict, compute eviction cost for candidate elements and evict the candidate elements with the lowest eviction costs and compacts cache slabs during the eviction process (e.g., similar to processes of a copying compacting garbage collector). Particular embodiments may choose to evict or preserve cache elements on an element-by-element basis. In contrast, prior database systems typically may be tied to the disk-block-based caches ("page caches"), and include approaches such as least recently used (LRU), Clock, adaptive replacement cache (ARC), and first in, first out (FIFO), which typically only evict or preserve entire disk blocks.

In particular embodiments, router 62 may direct query requests and other requests for particular information to the correct server to collect information from.

In particular embodiments, one or more indexes 64 may be built based on the data stored in data store 54 to allow for the data to be queried. For example, for every ID of a product, an index entry may be included where that product is stored on disk. In addition, the IDs may be sorted in a certain order (e.g., by date). In particular embodiments, indexes 64 may take mathematical set of constraints and ordering requirements and translate those into a set or sequence of data addresses on the disk, and those data addresses are then stored in the heap (described below). In particular embodiments, the index structure allows efficient answers to queries that use one or more search operators to filter their results or have a specified order or grouping to return results in. In particular embodiments, data is stored in a modified version of a Buffered B-Tree (which may be referred to as a streaming B-Tree) and automatically adjusts to minimize latency based on the query load. In particular embodiments, this allows for blocks to be converted to anywhere between write-optimized blocks with a small (e.g., two or more) number of descendant nodes and a very large write buffer to read-optimized unbuffered blocks and uses usage statistics and other techniques to choose if and when blocks are converted and to what new block type. In addition, this index system automatically creates and modifies indexes to minimize query latency by constantly monitoring usage to determine if new indexes need to be created or if vestigial ones need to be removed. Moreover, this index system adds and removes data columns to/from indexes (for example, to create a covering index). This system is capable of removing partial and partially materialized indexes, and all of these indexes are capable of referring to one or more data sources. In contrast, prior database systems typically use indexes that are managed by a database administrator who must manually monitor performance and respond to query loads.

In particular embodiments, the index block structure provides an efficient way of performing index seeks and scans by minimizing the number of cache lines read per query. Particular embodiments use a bitmap-accelerated radix tree to achieve very high performance for all key distributions. In contrast, prior database systems typically use direct or indirect sorted arrays which may be accelerated with a handful of techniques such as microindexing, prefix compression, and interpolation search, which only perform comparably with very uniform key distributions.

In particular embodiments, heap 66 may store all objects in data store 54, which are all stored at specific addresses referenced by one or more indexes 64 (e.g., based on product date, creation date, etc.). Specifically, heap 66 may store the physical addresses where the product may be found at, and reading heap 66 at the physical address will allow data store 54 to access the object to materialize a result for the query. Instead or in addition, particular embodiments may use indexes that map the indexed keys to one or more identifying keys (such as unique primary keys or ids) which can be used to find records by looking up the object data or object address via the identifying key's index (e.g., the primary key index).

As show in FIG. 2, after a result group of data results is materialized, the data results are encoded into bytecode by encoder 54, and then compressed by compressor 50. For example, this may be done in batches, and as a buffer fills up with results, the buffer is compressed and queued for transmission to the client. When the client's connection handler 28 receives the compressed bytecode, the compressed bytecode is requested and processed by client 20 so that the blocks of compressed bytecode are decompressed by decompressor 48, and then decoded by decoder 46. After decoding the bytecode, the data encoded by the bytecode may be returned to the native language associated with client 20 by result iterator 44.

In particular embodiments, with regard to FIGS. 1 and 2, ACID database system 10 may include scheduler 30, decompressor 32, decoder 34, virtual machine 36, JIT compiler 38, query planner 40, query iterator 42, encoder 52, and compressor 50, in addition to a connection handler such as connection handler 28. In particular embodiments, ACID database system 10 may include scheduler 30, decompressor 32, decoder 34, virtual machine 36, JIT compiler 38, query planner 40, query iterator 42, encoder 52, compressor 50, a connection handler such as connection handler 28, and data store 54 (which includes transaction manager 56, logger 58, cache 60, router 62, indexes 64, and heap 66). In particular embodiments, data store 54 may be part of the same program as the other server components, run on the same computer in a separate process, or include one or more separate processes running on one or more computers which may communicate with the query iterator via a network or other communications medium. In particular embodiments, ACID database system 10 may include parser 22, encoder 24, compressor 26, decompressor 48, decoder 46, result iterator 44, connection hander 28, scheduler 30, decompressor 32, decoder 34, virtual machine 36, JIT compiler 38, query planner 40, query iterator 42, encoder 52, and compressor 50. In particular embodiments, client 20, in addition to parser 22, encoder 24, compressor 26, decompressor 48, decoder 46, result iterator 44, and connection handler 28, may be located on web server 14 (e.g., a server associated with a client system).

In particular embodiments, from the client's perspective, when the client sends requests for data to a database (e.g., data store 54), and one or more results responsive to the request are processed through the pipeline (e.g., as shown in FIG. 2), query iterator 42 provides data manipulation instructions to the database, and the query returns the results to result iterator 44. As the client requests results, result iterator 44 will pull additional results from the database, which ultimately pull them from query iterator 42 and sends them through the pipeline to result iterator 44, which transforms them into native objects on the client's side. After the client sends a query and receives a first result group (e.g., objects 1-100), the client can then choose to get the next results (e.g., object 101-200) one or more times (as shown in FIG. 2), and read each new result group as it comes through. For example, if the client requests 10 results, all 10 results will likely be computed, but if the client requests thousands of results, then 100 of these results may first be computed, and when the client reaches the end of that set of results, then result iterator 44 will be prompted to obtain the next set of results (i.e., as shown by the "get next results" arrow). In particular embodiments, the results may be obtain asynchronously, so result iterator 44 may request the next results before the client has fully reviewed the current results (e.g., the results currently stored in memory).

In particular embodiments, there may be a connection handler associated with client 20, which may communicate with a connection hander associated with the server and data store 54, through a communication channel (e.g., on a network, or on a shared memory), and routers may be used to communicate between the server and client 20 through each side's connection handler.

Adaptive B-Tree Structure

Figure 3:
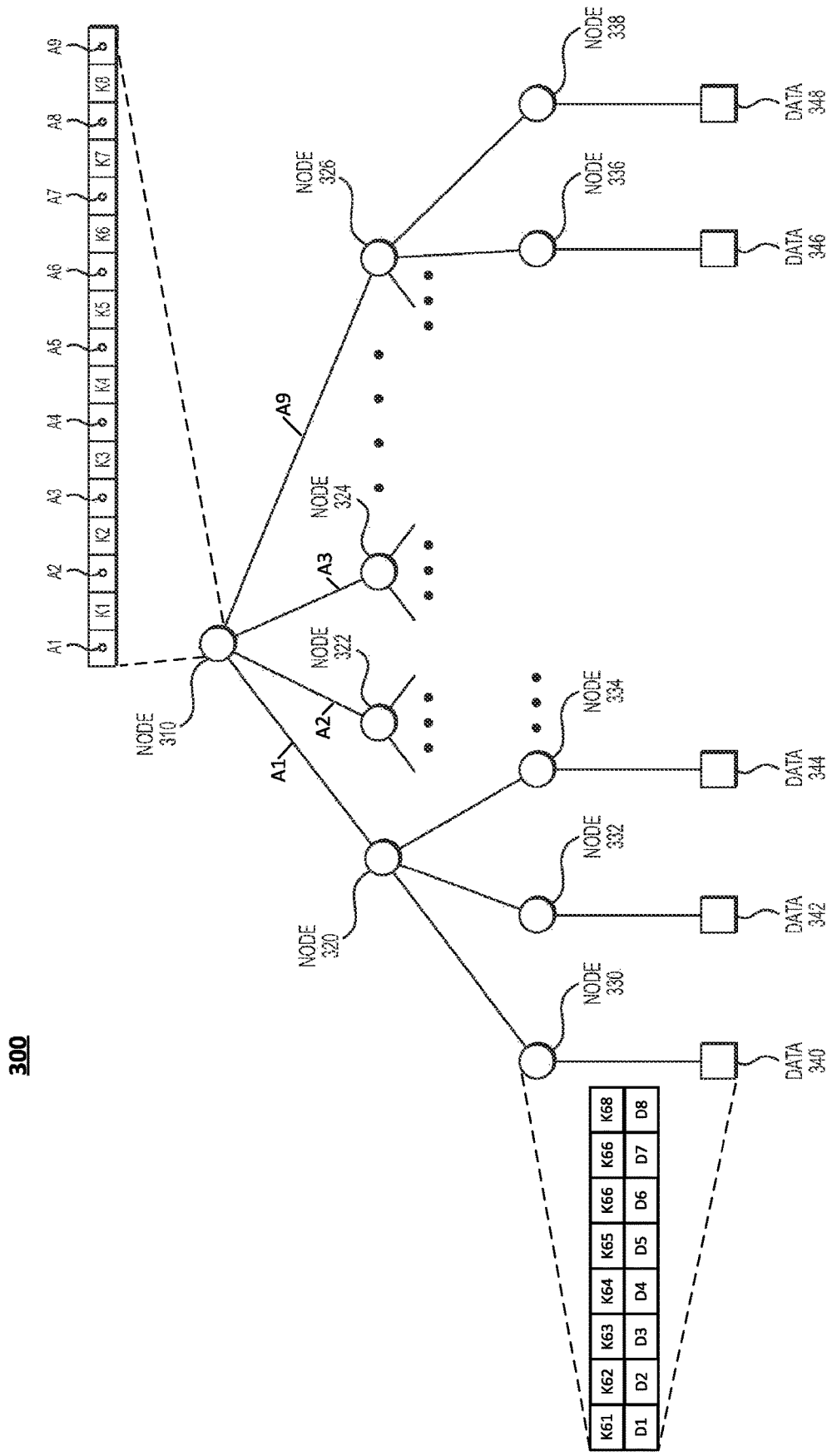
FIG. 3 illustrates an example b-tree index structure.

As discussed above with regard to FIG. 2, in particular embodiments, one or more indexes 64 may be built based on the data stored in data store 54 to allow for the data to be queried. As an example and not by way of limitation, indexes 64 may include a plurality of b-trees for accessing, reading, and writing data in a database. FIG. 3 illustrates an exemplary B-Tree 300 which may be used to read and write data in a database. The B-Tree 300 may be defined by a hierarchical search-tree structure that includes a plurality of nodes 310, 320, 322, 324, 326, 330, 332, 334, 336, 338, 340, 342, 344, 346, and 348. The plurality of nodes may include a plurality of non-terminal nodes (e.g., nodes 310, 320, 322, 324, 326), which are also known as "internal nodes," and a plurality of terminal nodes (e.g., nodes 330, 332, 334, 336, and 338), which are also known as "leaf nodes."

In particular embodiments, each non-terminal node may include a plurality of keys (e.g., N keys) and a plurality of pointers (e.g., N+1 pointers). As an example and not by way of limitation, FIG. 3 illustrates that node 310 (e.g., a non-terminal node) includes keys K1, K2, K3, K4, K5, K6, K7, and K8, and pointers A1, A2, A3, A4, A5, A6, A7, A8, and A9. Each of the plurality of keys may be a unique key assigned to an item of data in the database system 10. The plurality of keys (e.g., K1, K2, K3, K4, K5, K6, K7, and K8) may be organized in a particular order depending on the type of information each key holds. As an example and not by way of limitation, the keys may comprise numbers (e.g., 1, 2, 3, etc.), letters (e.g., A, B, C, etc.), strings (e.g., a string of letters and numbers, a string of letters and symbols, etc.), objects, other suitable values, or any combination thereof, and may be sorted by ascending/descending order, alphabetically, lexicographically, or any other suitable sorting methods based on the values of the keys. Each of the plurality of pointers (e.g., A1, A2, A3, A4, A5, A6, A7, A8, and A9) may correspond to an address associated with a node in the next hierarchical level of the B-tree structure. As an example and not by way of limitation, as shown in FIG. 3, pointer A1 may correspond to all data objects that are sorted to be less than or equal to the "value" of key K1 (e.g., associated with node 320), pointer A2 may correspond to all data objects that are sorted to be greater than the "value" of key K1 but less than or equal to the "value" of key K2 (e.g., associated with node 322), pointer A3 may correspond to all data objects that are sorted to be greater than the "value" of key K2 but less than or equal to the "value" of key K3 (e.g., associated with node 324), pointer A4 may correspond to all data objects that are sorted to be greater than the "value" of key K3 but less than or equal to the "value" of key K4, pointer A5 may correspond to all data objects that are sorted to be greater than the "value" of key K4 but less than or equal to the "value" of key K5, pointer A6 may correspond to all data objects that are sorted to be greater than the "value" of key K5 but less than or equal to the "value" of key K6, pointer A7 may correspond to all data objects that are sorted to be greater than the "value" of key K6 but less than or equal to the "value" of key K7, pointer A8 may correspond to all data objects that are sorted to be greater than the "value" of key K7 but less than or equal to the "value" of key K8, and pointer A9 may correspond to all data objects that are sorted to be greater than the "value" of key K8 (e.g., associated with node 326). In particular embodiments, all non-terminal nodes may be the same size and may contain the same number of keys and pointers. Although this disclosure describes non-terminal nodes of a b-tree index structure in a particular manner, this disclosure contemplates non-terminal nodes of a b-tree index structure in any suitable manner.

As an example of using the B-Tree 300 described, assume a user queries for employee information associated with Employee 66 in a company with 1000 employees. In this situation, key K1 may be associated with Employee 100, key K2 may be associated with Employee 200, key K3 may be associated with Employee 300, key K4 may be associated with Employee 400, key K5 may be associated with Employee 500, key K6 may be associated with Employee 600, key K7 may be associated with Employee 700, and Key 8 may be associated with Employee 800. In searching B-Tree 300 for information on Employee 66, at node 310 the database system 10 may make the determination to follow pointer A1 associated with all data objects that are less than or equal to the "value" 100 of key K1, traversing to the next level of the hierarchy to node 320. At node 320, which contains the same numbers of keys and pointers as node 310, the database system 10 will make the same determination as in node 310 and determine which pointer to follow based on the keys associated with the node (e.g., follow the pointer associated with all data objects that are sorted to be greater than a key with a "value" of 60 and less than a subsequent key with a "value" of 70). The database system 10 may proceed this way through the B-Tree 300 until it reaches a terminal node.

In particular embodiments, each terminal node may include a plurality of key-address pairs. As shown in FIG. 3, terminal node 330 may include 8 total keys including K61, K62, K63, K64, K65, K66, K67, and K68, associated with the addresses of data objects D1, D2, D3, D4, D5, D6, D7, and D8, respectively, located in data 340. Similarly, the keys associated with terminal nodes 332, 334, 336, and 338 may correspond to addresses of data objects located in data 342, 344, 346, and 348, respectively. In particular embodiments, similar to the non-terminal nodes, all terminal nodes may be the same size and may contain the same number of key-address pairs. In particular embodiments, terminal nodes may be the same size as the non-terminal nodes and contain the same number of keys. In the example of the user query for employee information associated with Employee 66, the database system 10 may determine at node 330 that key K66 corresponds to Employee 66, and then follow the address associated with key K66 to data object D6, where database system 10 may retrieve employee information stored in data 340 such as the address of the employee, the phone number of the employee, the social security number of the employee, etc. In particular embodiments, the numbers of keys and pointers in non-terminal nodes, and the numbers of key-data pairs in the terminal nodes, may depend on the size of each node, and thus the bigger the nodes, and more keys and points, and key-data pairs, it may contain. As an example and not by way of limitation, a node of 8 kilobytes where each key may be about 1 kb can hold up to 8 keys, while a node of 16 kilobytes, 32 kilobytes, or 64 kilobytes may hold up to 16 keys, 32 keys, or 64 keys, respectively. In particular embodiments, B-Tree 300 may include many levels of the b-tree structure hierarchy, where the number of levels may be determined based on the amount of data that is stored in the b-tree 300 and the fan-out (e.g., number of pointers at each of level of the b-tree hierarchy pointing to a node in the next level of the b-tree hierarchy) associated with each level. In particular embodiments, as shown in FIG. 3, every level of the b-tree structure hierarchy breaks the "key space" (e.g., amount of data associated with all data objects referenced in B-tree) into smaller and smaller components. In the example described above, information on a data object is retrieved from B-Tree 300 (e.g., a data object is "read" from the B-Tree 300). In particular embodiments, a data object and an associated key may also be inserted into the B-Tree 300 or removed from the B-Tree 300. Although this disclosure describes terminal nodes of a b-tree index structure in a particular manner, this disclosure contemplates terminal nodes of a b-tree index structure in any suitable manner The B-Tree 300 described is advantageous and efficient when used to find and read a particular data object in the B-Tree 300. However, when the B-Tree 300 is manipulated to make modifications to data objects (e.g., changing Employee 66's address), or add new data objects (e.g., adding new Employee 1001), the structure of B-Tree 300 may require that the database system 10 traverse the entire B-Tree 300 to get down to the terminal node corresponding to the addition or modification of data, and then modify the entire data object associated with the key (in the case of a modification to data objects) or modify the node to add new key information and new data-object information associated with the new key. In addition, a modification of the entire data object may result in a re-write of the entire data object (e.g., the entire disc block associated with the data object), which may require two re-write actions in database system 10, the first re-write action including a re-write of the data object to a log file (e.g., a backup file in case database system 10 loses power during the re-writing process) and then a second re-write action including the re-writing of the actual data object. The may result in a loss in efficiency and increase in latency of the database system 10 when data in the B-Tree 300 is added or modified.

Figure 4:
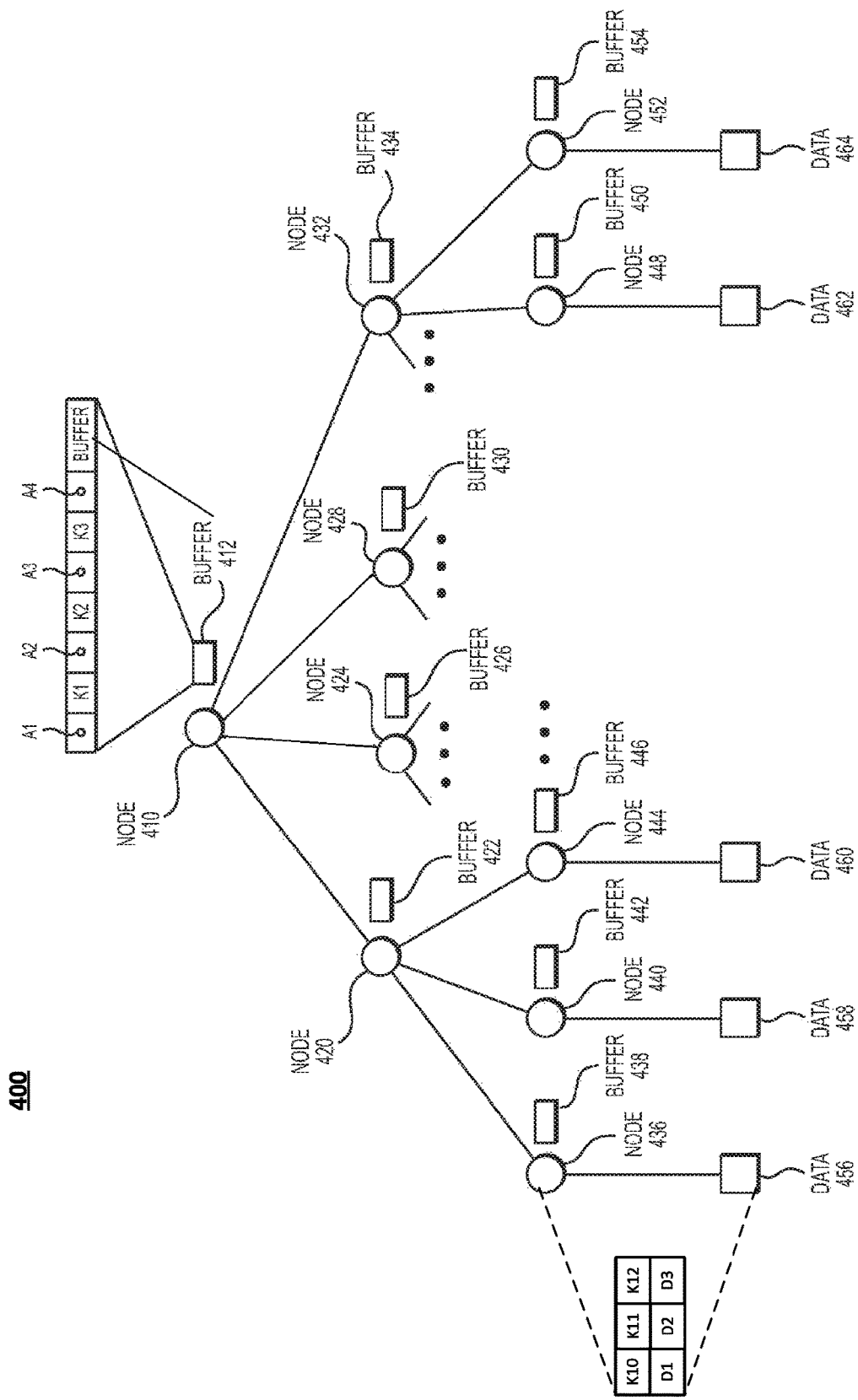
FIG. 4 illustrates an example buffered b-tree index structure.

In contrast, FIG. 4 illustrates an exemplary Buffered B-Tree 400 (or streaming B-tree) with highly efficient write characteristics. The Buffered B-Tree 400 may be defined by a hierarchical search tree structure that includes a plurality of nodes 410, 420, 424, 428, 432, 436, 440, 444, 448, and 452, and associated buffers 412, 422, 426, 430, 434, 438, 442, 446, 450, 454, respectively. The plurality of nodes may include a plurality of nonterminal nodes (e.g., nodes 410, 420, 424, 428, 432), and a plurality of terminal nodes (e.g., nodes 436, 440, 444, 448, and 452).

In particular embodiments, each non-terminal node may include a plurality of keys (e.g., N keys), a plurality of pointers (e.g., N+1 pointers), and a buffer associated with the space remaining in the node (e.g., the space remaining on the disc block associated with the node). As an example and not by way of limitation, FIG. 4 illustrates that node 410 (e.g., a non-terminal node) includes keys K1, K2, and K3, pointers A1, A2, A3, and A4, and buffer 412. Similar to B-Tree 300, for the Buffered B-Tree 400 in FIG. 4, each of the plurality of keys may be a unique key assigned to an item of data in the database. Similar to B-Tree 300, the plurality of keys (e.g., K1, K2, and K3) may be organized in a particular order depending on the type of information each key holds. As an example and not by way of limitation, the keys may comprise numbers (e.g., 1, 2, 3, etc.), letters (e.g., A, B, C, etc.), strings (e.g., a string of letters and numbers, a string of letters and symbols, etc.), objects, other suitable values, or any combination thereof, and may be sorted by ascending/descending order, alphabetically, lexicographically, or any other suitable sorting methods based on the values of the keys. Similar to B-Tree 300, for the Buffered B-Tree 400 in FIG. 4, each of the plurality of pointers (e.g., A1, A2, A3, and A4) may correspond to an address associated with a node in the next hierarchical level of the Buffered B-Tree structure. As an example and not by way of limitation, for the Buffered B-Tree 400 in FIG. 4, pointer A1 may correspond to all data objects that are sorted to be less than or equal to the "value" of key K1 (e.g., associated with node 410), pointer A2 may correspond to all data objects that are sorted to be greater than the "value" of key K1 but less than or equal to the "value" of key K2 (e.g., associated with node 424), pointer A3 may correspond to all data objects that are sorted to be greater than the "value" of key K2 but less than or equal to the "value" of key K3 (e.g., associated with node 428), and pointer A4 may correspond to all data objects that are sorted to be greater than the "value" of key K3 (e.g., associated with node 432). In particular embodiments, all non-terminal nodes may be the same size and may contain the same number of keys and pointers. Although this disclosure describes non-terminal nodes of a buffered b-tree index structure in a particular manner, this disclosure contemplates non-terminal nodes of a buffered b-tree index structure in any suitable manner.

In particular embodiments, each terminal node may include a plurality of key-address pairs and a buffer. As shown in FIG. 4, terminal node 436 may include 3 total keys including K10, K11, and K12, associated with the addresses of data objects D1, D2, and D3, respectively, located in data 340, and a buffer 438. Similarly, the keys associated with terminal nodes 440, 444, 448, and 452, associated with buffers 442, 446, 450, and 454, respectively, may correspond to addresses of data objects located in data 482, 460, 462, and 464, respectively. In particular embodiments, similar to the non-terminal nodes of Buffered B-Tree 400, all terminal nodes may be the same size and may contain the same number of key-address pairs with a corresponding buffer. In particular embodiments, in Buffered B-Tree 400, all terminal nodes may be the same size as all non-terminal nodes and contain the same number of keys. In particular embodiments, the numbers of keys and pointers and the size of the buffer in non-terminal nodes, and the numbers of key-data pairs and the size of the buffer in the terminal nodes, may depend on the size of each node. As an example and not by way of limitation, a node of 8 kilobytes where each key may be about 1 kb may contain 3 keys with a 5 kb buffer, or alternatively 2 keys with a 6 kb buffer, 4 keys with a 4 kb buffer, etc. For a node of 16 kilobytes, 32 kilobytes, or 64 kilobytes, the key-to-buffer ratio may be similar as that described above with respect to a 8 kb node. In particular embodiments, the buffer may be at least half of the size of the node. Although this disclosure describes terminal nodes of a buffered b-tree index structure in a particular manner, this disclosure contemplates terminal nodes of a buffered b-tree index structure in any suitable manner.

In particular embodiments, the Buffered B-Tree 400 may be advantageous and efficient when used to add and modify data objects in the Buffered B-Tree 400. In particular embodiments, when a "write" action (e.g., adding a new data object, modifying an existing data object) is received by database system 10, the write action may be initially stored in buffer 412 of node 410 until a predetermined number of write actions are collected such that buffered 412 is filled to capacity (or some other predetermined amount). As an example and not by way of limitation, if each write action is about 1 kb, and the size of node 410 is 8 kb, then each additional write action may be stored in the buffer 412 until a total of 5 "write" actions are collected and stored in the buffer. Once the database system 10 determines that the buffer 412 of node 410 is full, then the database system 10 "flushes" the "write" actions down the hierarchical Buffered B-Tree structure based on a buffer-emptying process. The buffer-emptying process may comprise the database system 10 accessing the next level of non-terminal nodes (e.g., nodes 420, 424, 428, and 432) to determine which non-terminal node (e.g., node 420) corresponds to the most number of the "write" actions. Once this is determined, the database system 10 will "flush" this portion of the write actions down to this corresponding non-terminal node (e.g., by moving these "write" actions to the buffer 422 associated with the node 420). Next, the database system 10 will determine another non-terminal node in the same level (e.g., among nodes 424, 428, and 432) that is associated with the most number of the remaining "write" actions maintained in the buffer 412, and move the next batch of "write" actions to the buffer associated with this second node (e.g., buffer 430 of node 428). The database system 10 may perform this buffer-emptying process recursively on all non-terminal nodes, and then after finish all buffer-emptying processes on non-terminal nodes, may then empty the buffers of the relevant non-terminal nodes (e.g., by make the modifications to the relevant data objects as determined by each of the "write" actions). In particular embodiments, the batch of "write" actions that are flushed down to a particular node in the next hierarchical level of the Buffered B-Tree structure may be combined into one single "write" action on the particular node that includes all modifications associated with each of the "write" actions of the batch, which results in economies of scale because a node may be rewritten with multiple pieces of data content all at once. Although this disclosure describes a buffer-emptying process in a particular manner, this disclosure contemplates a buffer-emptying process in any suitable manner.

On the other hand, the Buffered B-Tree 400 may be less efficient when used to find and read a particular data object in the Buffered B-Tree 400. In particular embodiments, due to the lower fan-out associated with the Buffered B-Tree 400, the database system 10 may need to traverse more levels of the b-tree hierarchy to reach the terminal nodes and the associated data objects. In addition, because write actions may remaining in the buffers associated with each node for a particular amount of time before being flushed down to the next level of the b-tree hierarchy, the database system 10 may need to check the buffers associated with each node to determine whether the buffer contains any data relevant to the query before moving onto the next node in the process of traversing down to the terminal nodes and the accessing the associated data objects.

Figure 5:
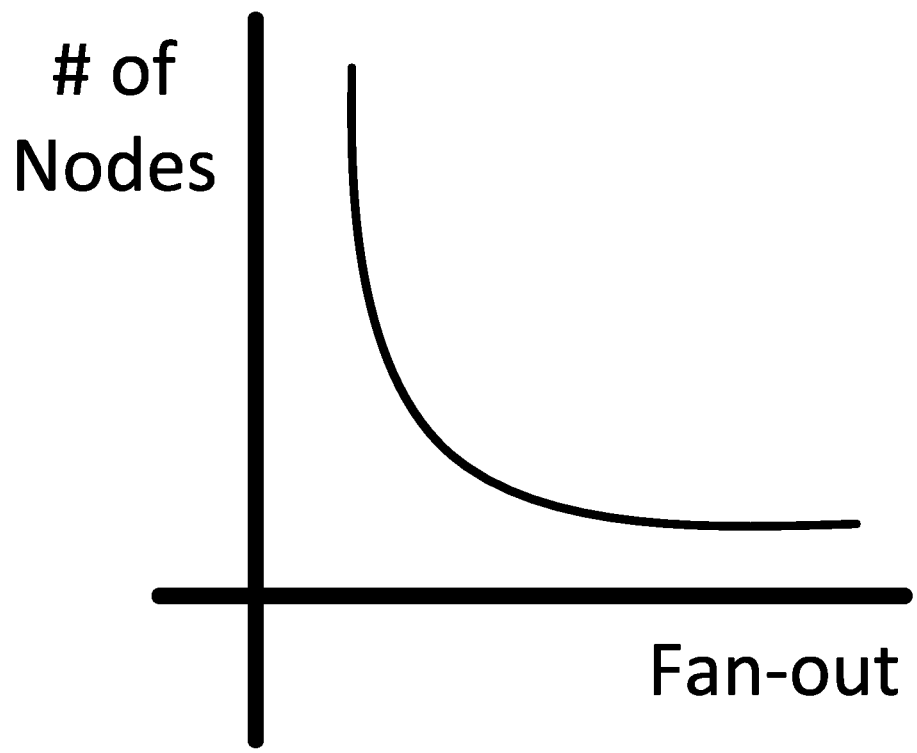
FIG. 5 illustrates a graph of a number of nodes in relation to a fan-out of a b-tree index structure.

In particular embodiments, Buffered B-Tree 400 may comprise many levels in the b-tree structure hierarchy, where the number of levels may be determined based on the amount of data that is stored in the b-tree 300 and the fan-out associated with each level. In particular embodiments, as compared with B-Tree 300, the Buffered B-Tree 400 may have a lower fan-out, which is due to the space in the node (e.g., space on the disc block) reserved for buffer space. In particular embodiments, the number of levels of the hierarchy of a B-Tree 300 or Buffered B-Tree 400 structure may be proportional to $\log_f n$, where f=the fan-out, and n=the number of nodes in the b-tree or buffered b-tree structure. As shown in FIG. 5, a lower fan-out may result in a high number of nodes in the b-tree or buffered b-tree structure, while a higher fan-out may result in a lower number of nodes. B-Tree 300 may have a higher fan-out (e.g., larger number of pointers to each of the next levels of the b-tree hierarchy), which results in a higher reading-speed of accessing and reading of data objects due to a lower number of levels in the b-tree hierarchy, but a lower writing-speed of adding and modifying data objects due to the necessity of traversing the entire b-tree hierarchy down to the terminal nodes and adding/modifying the terminal node and associated data object each time for every new write action. Accordingly, B-Tree 300 may be a more read-optimized b-tree structure. On the other hand, Buffered B-Tree 400 may have a lower fan-out (e.g., a smaller number of pointers to each of the next levels of the b-tree hierarchy), which results in a lower reading-speed of accessing and reading of data objects due to a higher number of levels in the b-tree hierarchy and the necessity of reviewing the buffers associated with each traversed node, but a higher writing-speed of adding and modifying data objects due to the ability to buffer a group of write actions and then batching the write actions so that the batches of write actions for a particular node can be done all at once. Accordingly, Buffered B-Tree 400 may be a more write-optimized b-tree structure.

As discussed above, in particular embodiments, data may be stored in a modified version of a Buffered B-Tree that automatically adjusts to minimize latency based on the query load (e.g., an Adaptive B-Tree). In particular embodiments, this allows for nodes (e.g., disc blocks) of the Adaptive B-Tree to be converted to anywhere between write-optimized nodes with a small (e.g., two or more) number of descendant nodes and a very large write buffer to read-optimized un-buffered nodes and uses usage statistics and other techniques to choose if and when nodes are converted and to what new nodes type. In the B-Tree 300 and the Buffered B-Tree 400 described above, the determination of whether a database may be more read-optimized (e.g., with a structure such as B-Tree 300) or more write-optimized (e.g., with a structure such as Buffered B-Tree 400) is determined for the entire b-tree structure. In other words, all the nodes associated with B-Tree 300 and Buffered B-tree 400 are the same as each other (e.g., either all nodes contain the same number of keys and pointers, or all nodes contain the same key-pointer-buffer ratio). However, in particular embodiments, the Adaptive B-Tree allows for the determination on a node-by-node basis of whether a particular node will be a read-optimized node (e.g., high fan-out, no buffer node) or a write-optimized node (e.g., low fan-out node with a buffer). In other words, for the Adaptive B-Tree structure, the amount of buffer vs. fan-out for a particular node is determined on a node-by-node basis for each of the individual nodes of the entire b-tree structure. In particular embodiments, this node-by-node determination by the Adaptive B-Tree for whether a particular node will be a read-optimized node or a write-optimized node may be determined automatically by database system 10 (e.g., based on predefined tuning parameters accessing various components of the database system 10), may be set by the user/administrator (e.g., based on certain events or knowledge such as a system update where the user would want one or more nodes to be more write-optimized, coverage of a special event where the user would want one or more nodes to be more read-optimized, etc.), other suitable determination, or any combination thereof. Although this disclosure describes an adaptive b-tree in a particular manner, this disclosure contemplates an adaptive b-tree in any suitable manner.

In particular embodiments, a mechanism for determining whether a particular node of the Adaptive B-tree should be read-optimized or write-optimized may include determining that when a node is accessed for a "read" action (e.g., accessing data associated with the node itself or a descendant node), adjusting the particular node to be more "read" amenable, and similarly, when a node is accessed for a "write" action (e.g., editing or adding data associated with the node itself or a descendant node), adjusting the particular node to be more "write" amenable. In particular embodiments, the probability (e.g., likelihood) that a particular node may be made to be more "read" amenable or "write" amenable may be determined based on a particular diffusion probability, which may be determined based on experimentation (e.g., running tests on database system 10 and determining the diffusion probability that works best for a system of M nodes with a particular fan-out), an artificial intelligence layer of the database system 10 constantly determining the optimal "read" and "write" characteristics of each of the nodes based on query load, a preset parameter (e.g., determined by database system 10 or by a user/administrator), other suitable determination means, or any combination thereof. As an example and not by way of limitation, in determining whether a particular node should be adjusted to be more "read" amenable, the diffusion probability may be set to $\lambda=\frac{1}{100}$ (e.g., 1 out of every 100 reads), such that when a node is accessed for a "read" action, there is a probability of $\frac{1}{100}$ that the node will be adjusted to be more "read" amenable (e.g., by decreasing the buffer size and increasing the fan-out of the node). As another example and not by way of limitation, in determining whether a particular node should be adjusted to be more "write" amenable, the diffusion probability may be set to 1 out of every 100 writes, such that when a node is accessed for a "write" action, there is a probability of $\frac{1}{100}$ that the node will be adjusted to be more "write" amenable (e.g., by increasing the buffer size and decreasing the fan-out of the node).

In particular embodiments, "read" actions received by database system 10 may be received one by one. As an example and not by way of limitation, assume an example of a particular node that is write-optimized with a size of 16 kb, a fan-out of 4 with a size of 4 kb, and a buffer of 12 kb. When a "read" action is received by database system 10 and "touches" the particular write-optimized node (e.g., either by accessing data associated with the node itself or a descendant node), then the probability that the particular node will be adjusted to be more read-optimized may be based on the diffusion probability of $\lambda=\frac{1}{100}$ (e.g., once out of 100 instances of this occurrence of this situation). As an example and not by way of limitation, database system 10 may use a random number generator or other suitable means for determining whether the diffusion probability of $\lambda=\frac{1}{100}$ applies to each of the particular nodes that the "read" action propagates through. If it is determined that the particular node is to be adjusted to be more read-optimized, then the database system 10 may increase the fan-out and decrease the buffer associated with the particular node. As an example and not by way of limitation, in the example above, the database system 10 may increase the fan-out by increasing the fan-out from 4 kb to 6 kb (and decreasing the buffer to 10 kb), doubling the fan-out from 4 kb to 8 kb (and decreasing the buffer to 8 kb), increasing the fan-out from 4 kb to 10 kb (and decreasing the buffer to 6 kb), increasing the fan-out from 4 kb to 12 kb (and decreasing the buffer to 4 kb), or increasing the fan-out from 4 kb to 18 kb (and completely removing the buffer). In particular embodiments, whenever the database system 10 decreases the buffer such that the buffer is smaller than half the size of the node, the database system 10 may automatically remove the buffer and make the node a completely un-buffered node. In particular embodiments, in increasing fan-out of the particular node, the database system 10 may look to neighboring nodes (e.g., a preceding node or subsequent node on the same hierarchical level as the particular node) and move a group of descendant nodes associates with a neighboring node to the particular node or alternatively may merge a neighboring node with the particular node to achieve a particular fan-out structure, the database system 10 may change the designation of the particular node's fan-out capacity (e.g., from 4 kb to 8 kb) so that future write actions will fill the additional fan-out capacity, other suitable methods for the increase of the fan-out of the particular node, or any combination thereof. In particular embodiments, the database system 10 may fix a maximum node size such that a node that is triggered to be more read-optimized will be limited to increasing the fan-out based on the above-discussed methods until the node reaches the maximum node size.

In particular embodiments, "write" actions received by database system 10 may be received in batches of more than one (e.g., 50 "write" actions, 100 "write actions, etc.). As an example and not by way of limitation, assume an example of a particular node that is read-optimized with a size of 16 kb, a fan-out of 8 with a size of 8 kb, and a buffer of 8 kb. When a "write" action is received by database system 10 and "touches" the particular write-optimized node (e.g., either by accessing data associated with the node itself or a descendant node), then the probability that the particular node will be adjusted to be more write-optimized may be based on the diffusion probability of $\lambda=1/100$ (e.g., once out of 100 instances of this occurrence of this situation). If it is determined that the particular node is to be adjusted to be more write-optimized, then the database system 10 may decrease the fan-out and increase the buffer associated with the particular node. In particular embodiments, in decreasing fan-out of the particular node, the database system 10 may split the particular node into two separate nodes each with one-half the fan-out of the original node (e.g., 2 nodes each with a fan-out of 4) and a larger buffer (e.g., each of the 2 new nodes has a buffer of 12 kb), other suitable methods for decreasing the fan-out of the particular node, or any combination thereof. In particular embodiments, the database system 10 may determine a minimum node fan-out amount (e.g., fan-out of 2) such that a node that is triggered to be more write-optimized will be limited to decreasing the fan-out to the minimum node fan-out amount.

Similar to when a "read" action is received, when a "write" action is received, database system 10 may use a random number generator or other suitable means for determining whether the diffusion probability of $\lambda=1/100$ applies to each of the particular nodes that the "write" action propagates through. A difference is that since "write" actions typically are received in batches, database system 10 may determine the probability for each particular node that the "write" action propagates through for every single "write" action of the batch of write actions to determine if any of the "write" actions would individually trigger an adjustment of the read-optimized node to a more write-optimized node, and also if any of the particular nodes have been triggered more than once (e.g., which may result in write-optimizing a particular node multiple times). In particular embodiments, if a particular node is triggered to be more write-optimized multiple times by more than one "write" action of a batch of "write" actions, the database system 10 may use a geometric distribution algorithm to compute the diffusion probability for the multiple "write" actions all at once. The database system 10 may use any suitable sampling algorithm to draw a sample from the geometric distribution corresponding to the appropriate diffusion probability (e.g., $\lambda$) and a number of "write" actions being flushed to a particular node if the database system 10 (e.g., k). The sample may be zero, one, two, or more. The number sampled may correspond to the number of write-optimized notches the particular node would be advanced by. As an example and not by way of limitation, the sampling algorithm may be a probability mass function of the geometric distribution, calculated based on $\lambda(1-\lambda)^{k-1}$, where $\lambda$=the diffusion probability and k=the number of "write" actions that "touches" a particular node (e.g., that is being flushed to a node). As another example and not by way of limitation, the sample algorithm may be a cumulative distribution function of the geometric distribution, calculated based on $1-(1-\lambda)^k$, where $\lambda$=the diffusion probability and k=the number of "write" actions that "touches" a particular node (e.g., that is being flushed to the node). In particular embodiments, other suitable methods may be used as well, such as a method that takes advantage of the batch nature of the "write" flushes to make less variable steps (e.g., multiplying the number of "write" actions being flushed to a particular node by the diffusion probability $\lambda$, and then using randomized rounding to determine the number of steps to take on the particular node). Although this disclosure describes using particular geometric distribution algorithms to compute a diffusion probability in a particular manner, this disclosure contemplates using any geometric distribution algorithm to compute the diffusion probability in any suitable manner.

In particular embodiments, the diffusion probability may be set to $\lambda=1/10$, $\lambda=1/100$, $\lambda=1/1000$, or other suitable diffusion probability. As an example and not by way of limitation, a probably that is set too high (e.g., $\lambda=1$) may trigger an adjustment of a particular node to be either more read-optimized or write-optimized at every instance a "read" action or "write" action "touches" a particular node, which would cause the nodes to swing between being read-optimized and write-optimized at a frequency that may be detrimental to overall latency of the database system 10. On the other hand, never adjusting a particular node to be more read-optimized or write-optimized (or, for example, setting a probability that is too low such as $\lambda=1,000,000,000,000$) would result in the database system 10 being unable to adapt to or to slow in adapting to any changes in the workload (e.g., of received queries of "read" actions and "write" actions). In particular embodiments, the diffusion probability may be set as a single, system-wide diffusion-probability setting for the database system 10. Alternatively, in particular embodiments, different diffusion probabilities may be used for different Adaptive B-Tree indexes (e.g., different diffusion probabilities for separate Adaptive B-tree indexes) and/or different portions within a single Adaptive B-tree index of the database system 10. In particular embodiments, factors that database system 10 may assess to determine whether or not to adjust a particular node may include the number of absolute reads and/or absolute writes associated with a particular node, the ratio between reads and writes for a particular node, the total volume of queries associated with the database system 10, the size of the data associated with a "read" action or "write" action (e.g., smaller data will perform better with a buffer than large data), manual control (e.g., an administrative command in which the diffusion probability may be frozen or set administratively based on an event such as a system update or special event, switching between read-optimized and write-optimized for a particular website such as a social-networking website, etc.), other suitable factors, or any combination thereof. Although this disclosure describes a diffusion probability in a particular manner, this disclosure contemplates a diffusion probability in any suitable manner.

In particular embodiments, the diffusion probability may also be used in other parts of the database system 10. As an example and not by way of limitation, when the database system 10 receives a query for a particular parameter that is not associated with any available b-tree search index, the database system 10 may need to scan every b-tree search index in order to retrieve the information for the query. In the situation where the database system 10 receives multiple queries for the same parameter, the database system 10 may use the diffusion probability method to determine when it may want to create a new b-tree search index with keys corresponding to the parameter. As another example and not by way of limitation, when the database system 10 determines that a b-tree index has not been updated in a long time, the database system 10 may use the diffusion probability method to determine when it may be good to delete the unused b-tree index and free the corresponding disc space for other data. Although this disclosure describes examples of using a diffusion probability in a particular manner, this disclosure contemplates using a diffusion probability in any suitable manner.

Figure 6:
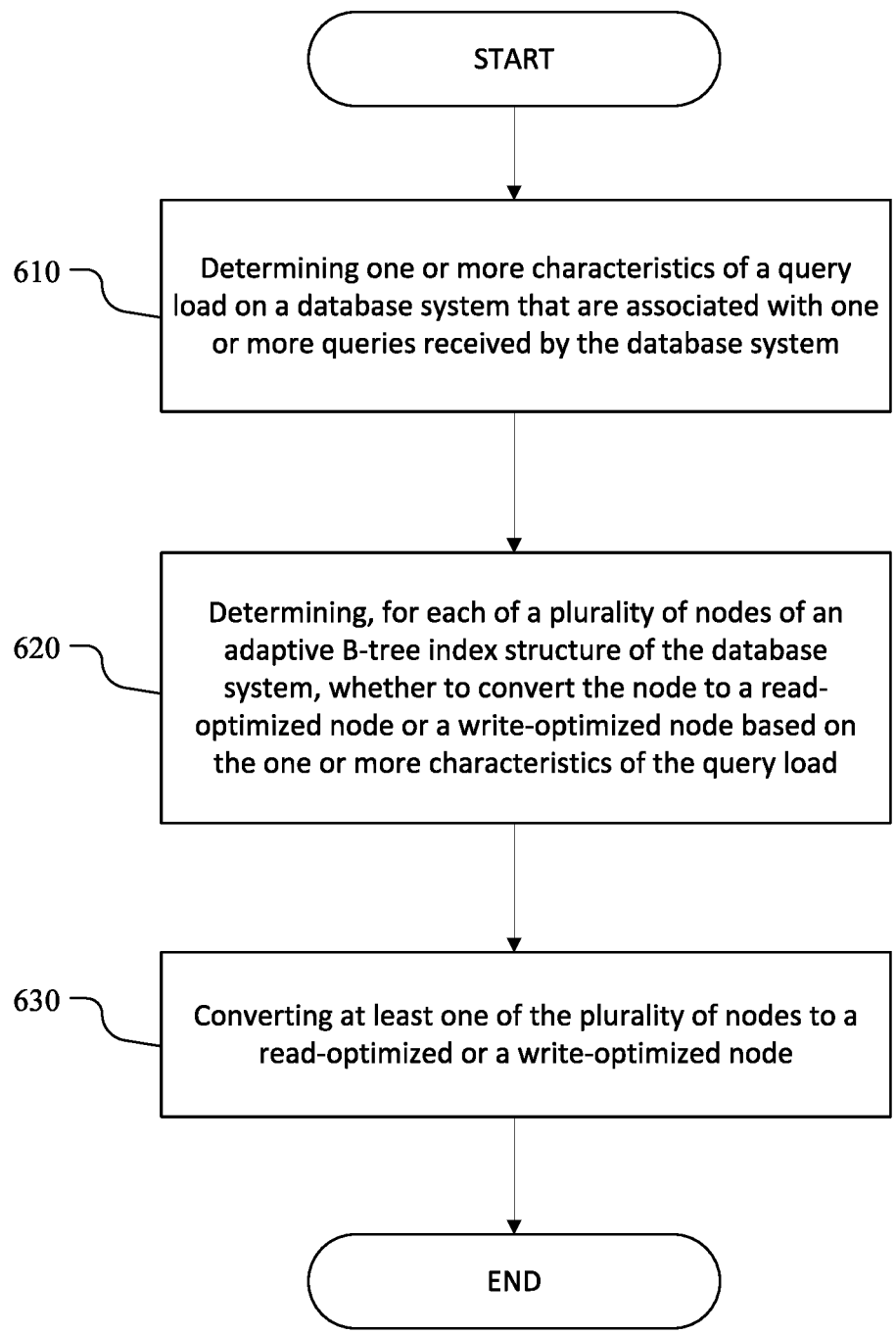
FIG. 6 illustrates an example method for minimizing latency of a query load on a database system by accessing data using an adaptive B-tree index structure.

FIG. 6 illustrates an example method 600 for minimizing latency of a query load on a database system by accessing data using an adaptive B-tree index structure. The method may begin at step 610, where the database system 10 may determine one or more characteristics of a query load that are associated with one or more queries received by the database system 10. At step 620, the database system 10 may determine, for each of a plurality of nodes of the adaptive B-tree index structure, whether to convert the node to a read-optimized node or a write-optimized node based on the one or more characteristics of the query load. At step 630, the database system 10 may convert at least one of the plurality of nodes to a read-optimized node or a write-optimized node based on the one or more characteristics of the query load. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for minimizing latency of a query load on a database system by accessing data using an adaptive B-tree index structure including the particular steps of the method of FIG. 6, this disclosure contemplates any suitable method for minimizing latency of a query load on a database system by accessing data using an adaptive B-tree index structure including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

User Interface Structure

Particular embodiments allow users to create, test and deploy complex search and recommendation algorithms instantly. Site search for e-commerce companies may be complex and important. In many cases, these companies will have catalogs (products, listings, flights, etc.) that have millions of entries and high quality, relevant results are expected to be delivered to customers in a fraction of a second.

Figure 7:
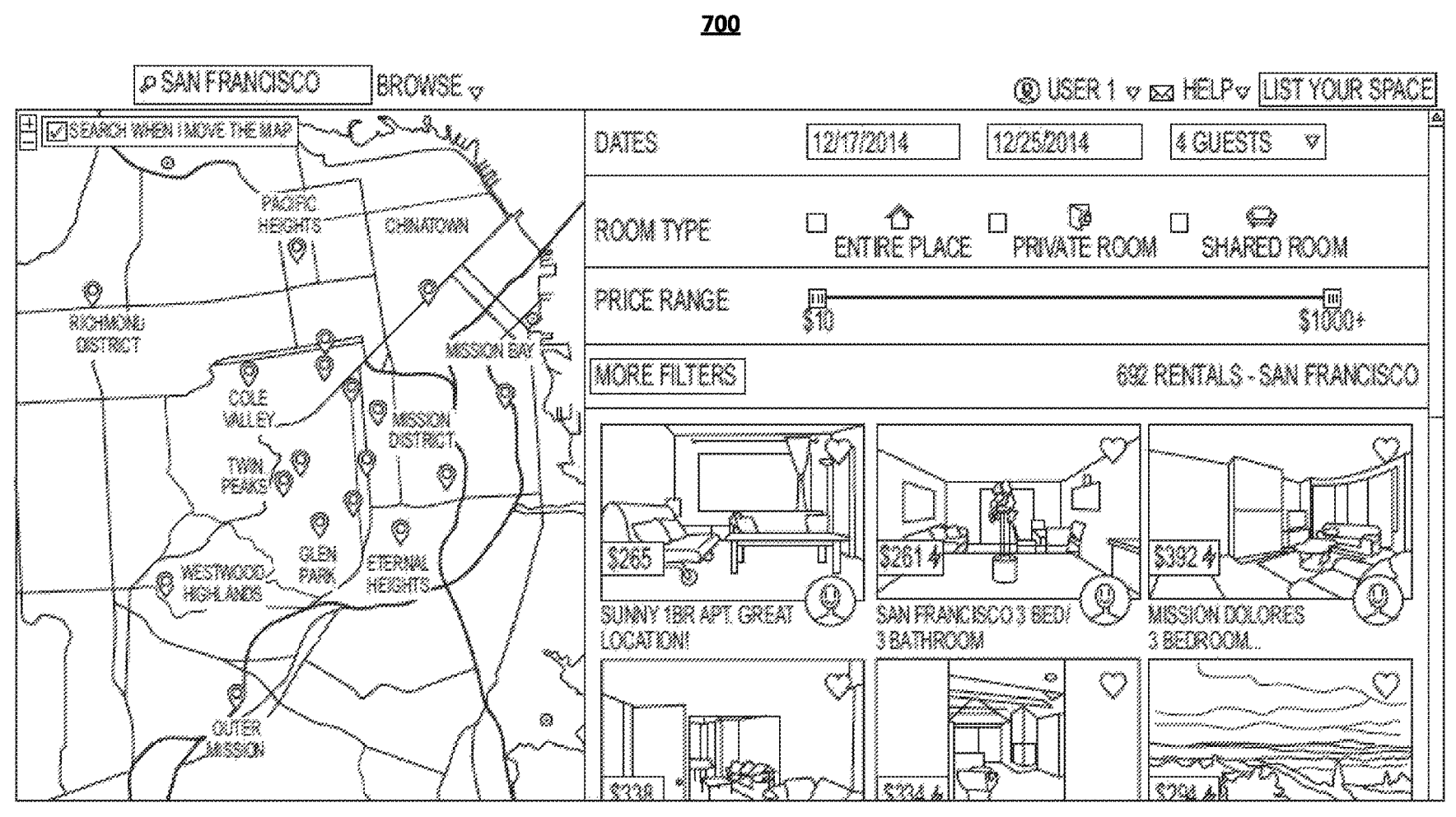

In particular embodiments, these search algorithms may incorporate multiple weighted factors in determining how results will be filtered and sorted. FIG. 7 illustrates an example user interface 700 for a sample client website that lists lodgings for rent that accepts user search requests and retrieves results based on the search request.

Once the search request is processed (e.g., based on the streaming-data protocol described above), all results can be sorted in descending order by document score and delivered to customers. As an example, in prior database systems, these algorithms may be managed in code by search engineers because in order to deliver required speeds, the underlying data had to be pre-calculated. In these embodiments, an interactive user interface would be only marginally useful because the data was immutable. In contrast, in particular embodiments of the example embodiment, components on a user interface may allow a user to easily and quickly make changes to the most complex and scaled search and recommendation database systems, as described below with respect to FIGS. 8-15 in the attached sheets.

Figure 8:
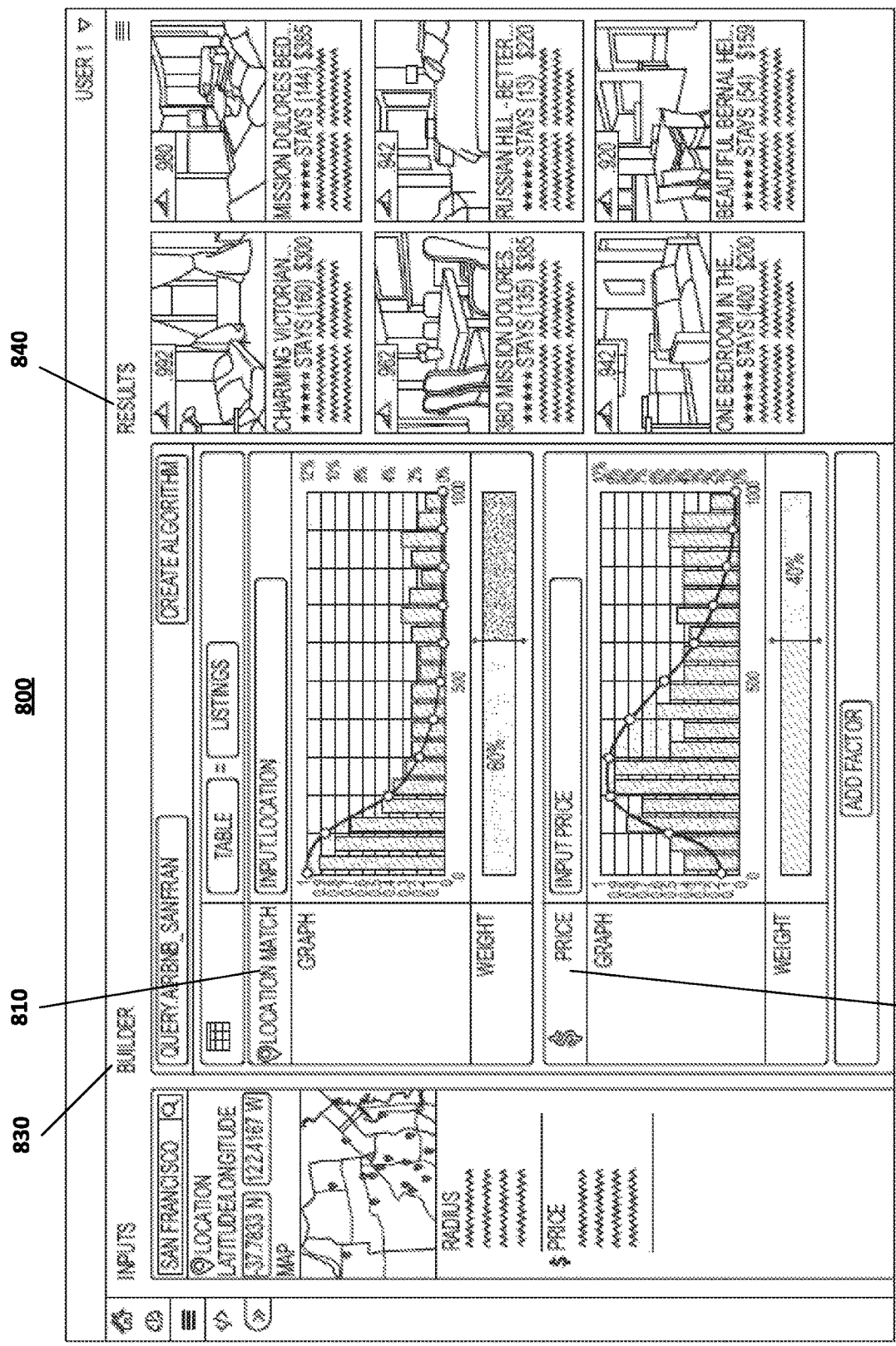

In the example of FIG. 8, a user interface 800 exhibits real-time factor normalization. The user interface may provide a visual breakdown of the search algorithm. As an example, FIG. 4 shows a two-factor search (e.g., factors 810 and 820) on the sample client website that lists lodgings for rent with the user input/parameter of "San Francisco." As shown in the "builder" section 830 of the user interface, the two factors used to rank the results include location match 810 and price 820. With regard to the first factor of location match 810 (e.g., distance), because the user input indicates that the user likely wants to look for lodging close to San Francisco, the curve representative of the data will show an increase for low distances (and thus higher scores for these lodgings) and a decrease for high distances (and thus lower scores for these lodgings). In particular embodiments, the interface allows the user to drag and drop the curve, which would result in real-time updates to optimal factor parameters and real-time changes to the results displayed in the "results" section. With regard to the second factor of price 820, for example, the interface allows users to modify factor normalization curves and see the results in real time in the "results" section 840. For example, if a user wanted to optimize search results around a $250 price point, that user could draw a curve that peaks at $200 and falls off on the tails. The steeper the user makes that curve, the tighter the results will be around that $200 price point.

Particular embodiments may include factoring weighting. For example, the algorithm for a search for a particular listing of lodgings may be:

Document score=(0.4×Location Score)+(0.2×Price Score)+(0.2×Rating Score)+(0.2×Stays Score)

In this example, the factor weights were 0.4, 0.2, 0.2, and 0.2 respectively. In particular embodiments, the example interface uses a slider to allow users to change those weights in real time and preview results, which may be very useful for optimizing and testing a particular algorithm with multiple variants. In particular embodiments, in a matter of seconds, a marketer or product manager may create a dozen variants with slightly different weights which could be created and deployed through an existing AB or multivariate testing system. In particular embodiments, the interface components may be tied to the setup of the database, which allows for real-time changes to results. Factors may be weighted and combined using any desired technique, which may include the above weighted-sum method, multiplicative methods (multiplying the weighted values instead of adding them), and more complex techniques such as adding the logarithms of the weighted values (as in, e.g., Naïve Bayes and other Bayesian methods).

Figure 9:
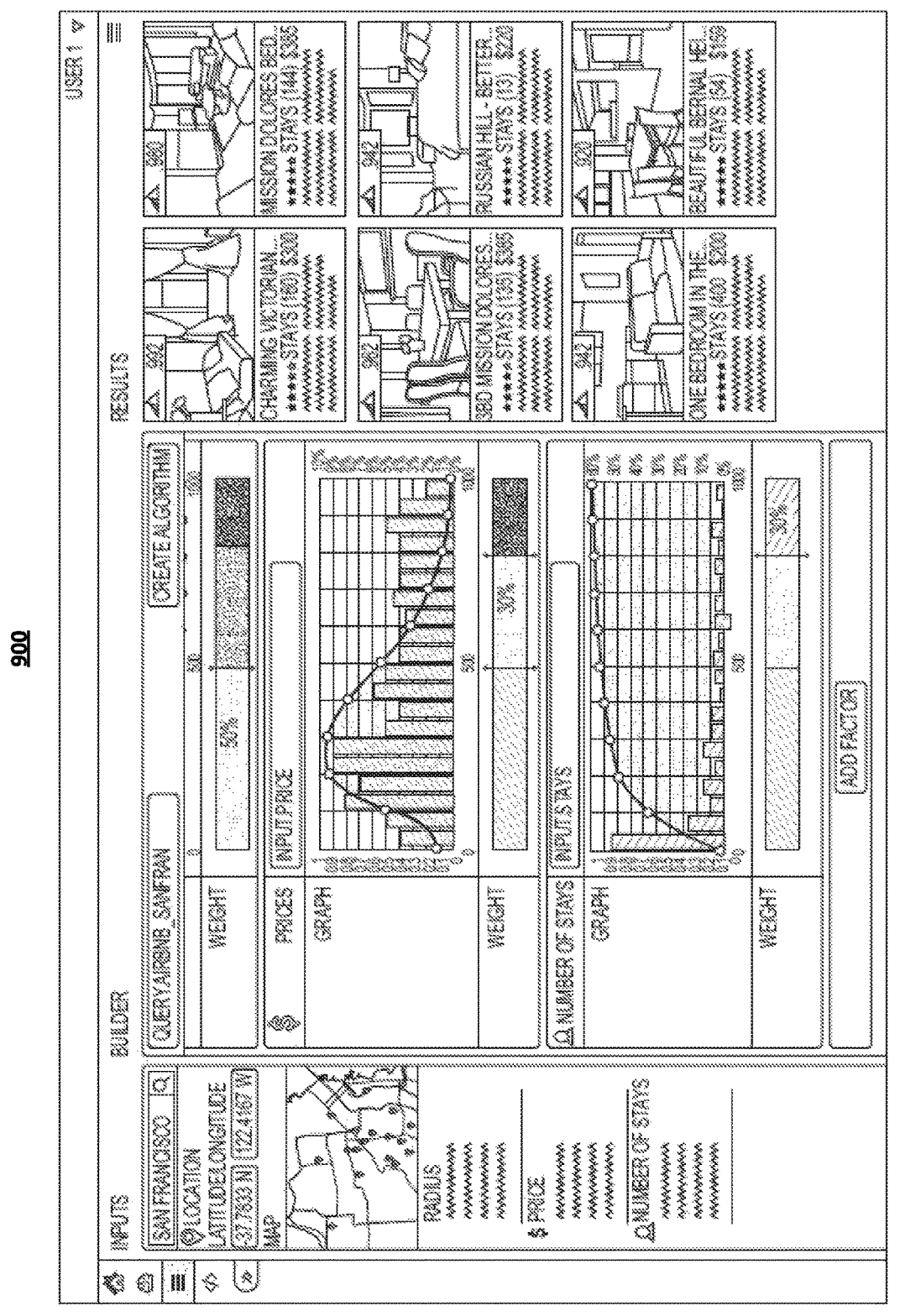
Figure 10:
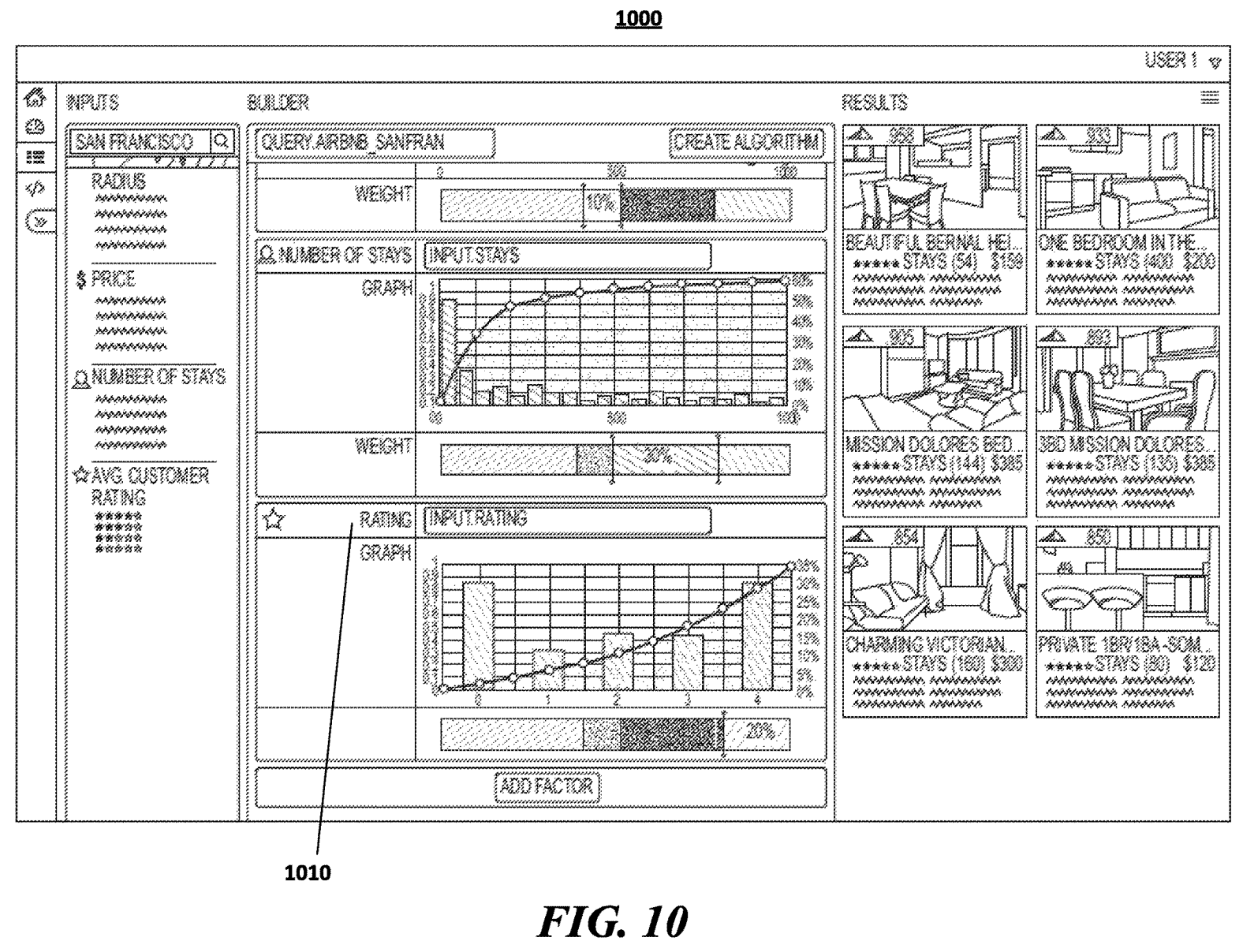
Figure 11:
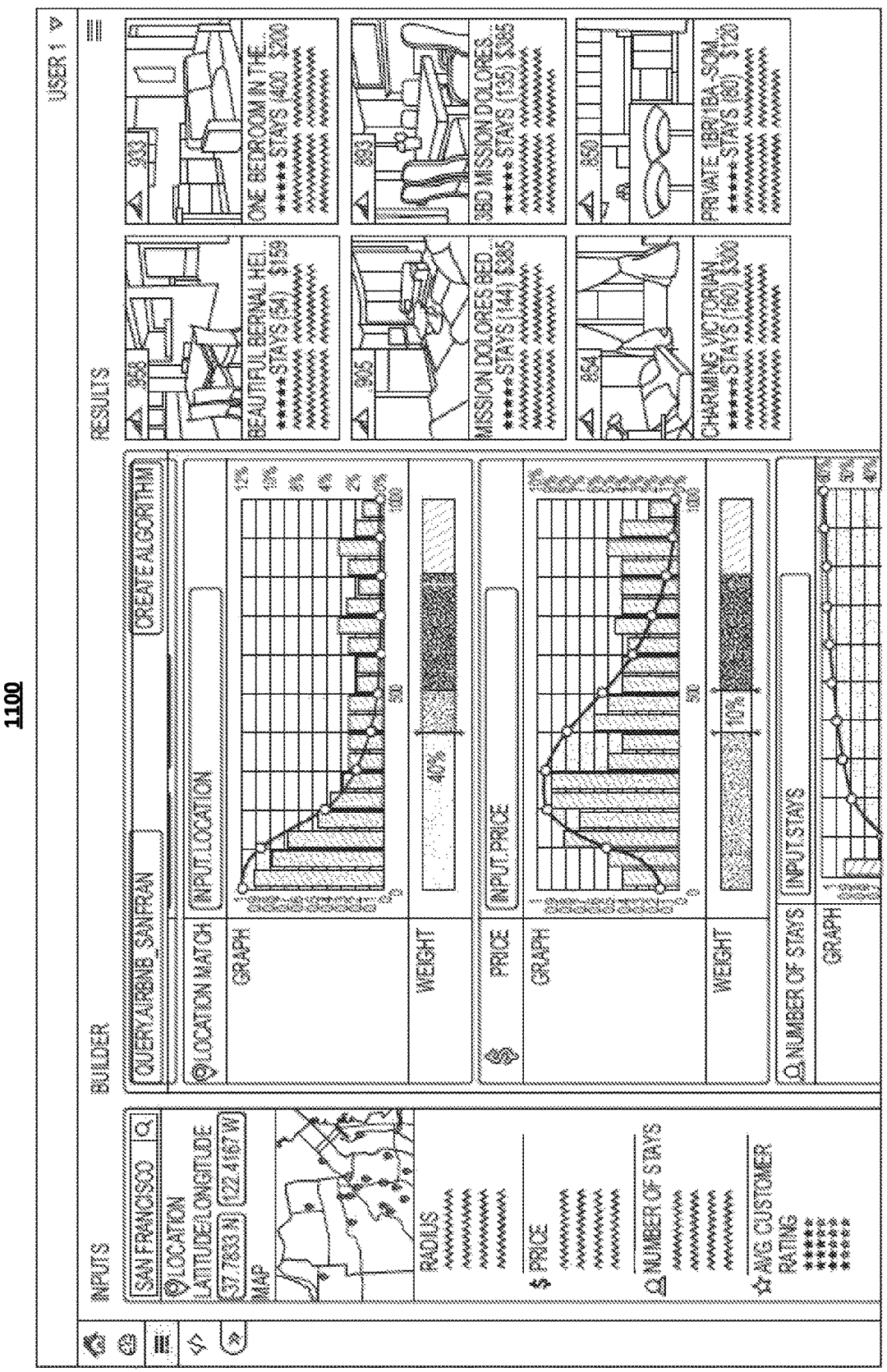

In particular embodiments, a query may be said to be composed of a sequence or set of "expressions" which may include filters, joins, sorts, slices, merges, mappings, transformations, assignments, function definitions, or other elements which may correspond to expressions in the query language, such as TQL. "Factors" are expressions which affect sort order. FIGS. 9-11 illustrate examples user interface 900, user interface 1000, and user interface 1100, respectively, of an example UI feature for adding one or more expressions to the example search results in FIG. 8.

Figure 12:
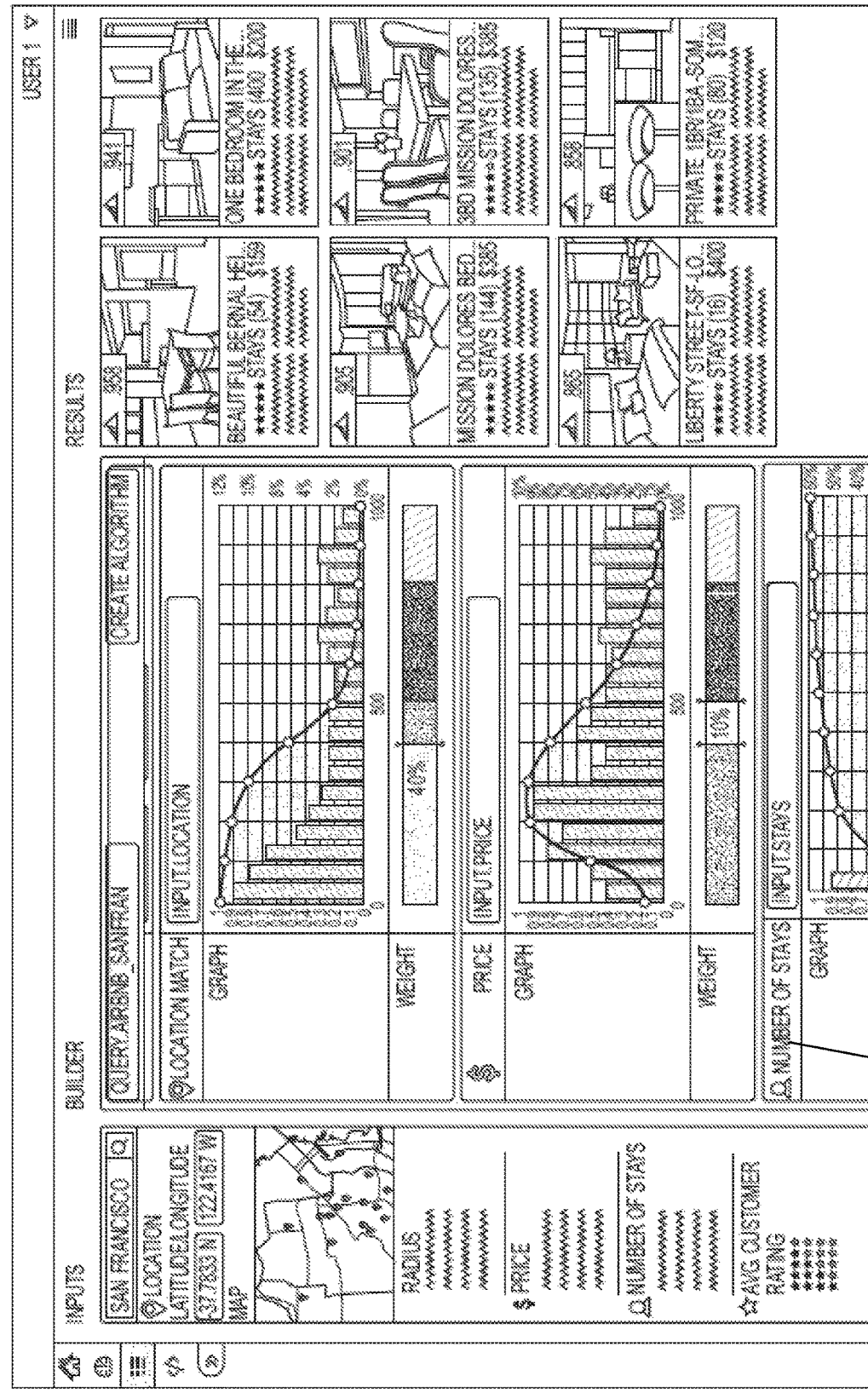
Figure 13:
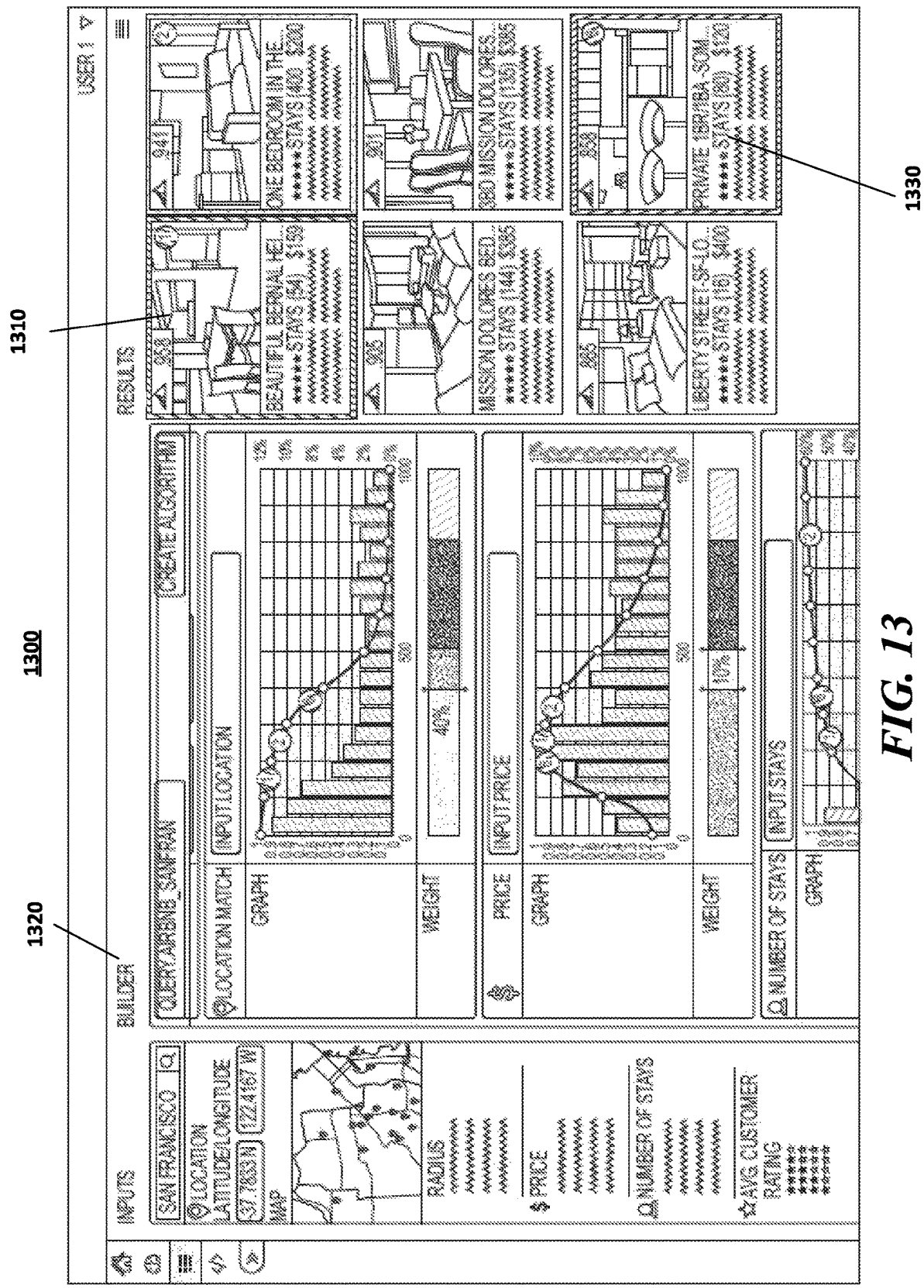

In the examples of a user interface 1200 and a user interface 1300 of FIGS. 12 and 13, respectively, simple factor addition is illustrated. The interface hooks up to a backing database and is aware of all factors or attributes that are available. This means that a user can click the "Add Factor" button, select an attribute (e.g., price, location, number of stays, customer review, text description) and add it to the algorithm in seconds. Alternatively, the user may be able to select an expression type from a menu of suggested types and immediately instantiate an expression of that type. If creating a factor, the user would then create the desired curve (shown in the "builder" section) and weight (shown in "builder" section below the curve/graph) and the results can immediately be previewed (in the "results" section). For example, as shown in FIG. 12, when a user first adds a new factor (e.g., number of stays 1210), a graph will be displayed with a flat line (e.g., indicating that the total number of stays currently does not matter and has no effect on the algorithm). When the user normalizes the curve, they user may normalize the curve based on the determination a certain number of threshold stays is an important factor in determining the algorithm for the search. In particular embodiments, the user may interactively move the curve using the interface (as shown in user interface 1400 of FIG. 14 and user interface 1500 of FIG. 15), define the curve based on a mathematical or piecewise function, and also manipulate the weight given to that specific factor. Similarly, FIG. 10 shows the addition a fourth factor of "ratings" 1010 and the resulting effects. For example, the results shown in the "results" section will shift in real time so that the user can see the immediate impact of the changes to the algorithm. In particular embodiments, the impact of the changes may be viewed in real time due to the efficiency and speed of the underlying database, even on a massive scale and with a large number of results.

Particular embodiments include facet management. If a user wants to have facets available in their search engine, the user interface allows them to create those "buckets" and preview algorithms based on which buckets are currently selected. These selections are immediately reflected in the results pane.

Figure 15:
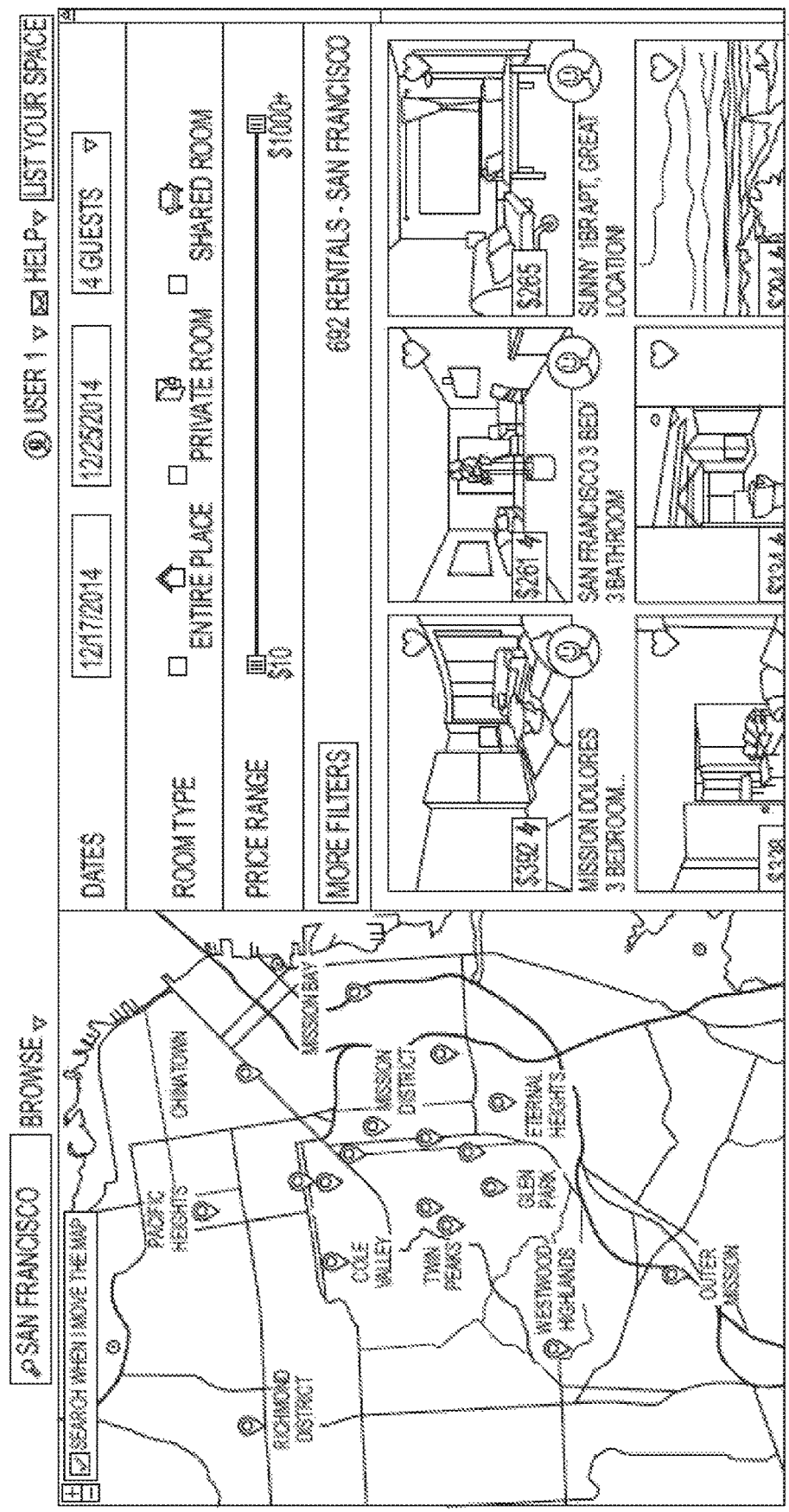

As shown in user interface 1500 of FIG. 15, particular embodiments include interactive results previewing and spotlighting. In particular embodiments, users (and customers of users) may preview search and recommendations results at any time on the right side by providing needed input data (in this example, the words "San Francisco"). The results are driven by the algorithm currently loaded into the tuner and will change in real time whenever the user makes changes in the interface. Users can also drag any single result and place it anywhere else if they want to manually curate a result.

Spotlighting allows users to select specific results and see on the factor curves how the result ranks. As shown in FIG. 13, when a search result 1310 is selected (e.g., the $1^{st}$ position search result shown in the top left corner of the "results" section), a colored halo is created around that particular search result, and the "builder" section 1320 shows a factor-by-factor break down of where each element of each factor is indexed by showing a color-matching bubble on the graph of each factor. In particular embodiments, this may provide the user with a visual understanding of how the algorithm-based ranking of the result is determined.

Figure 14:
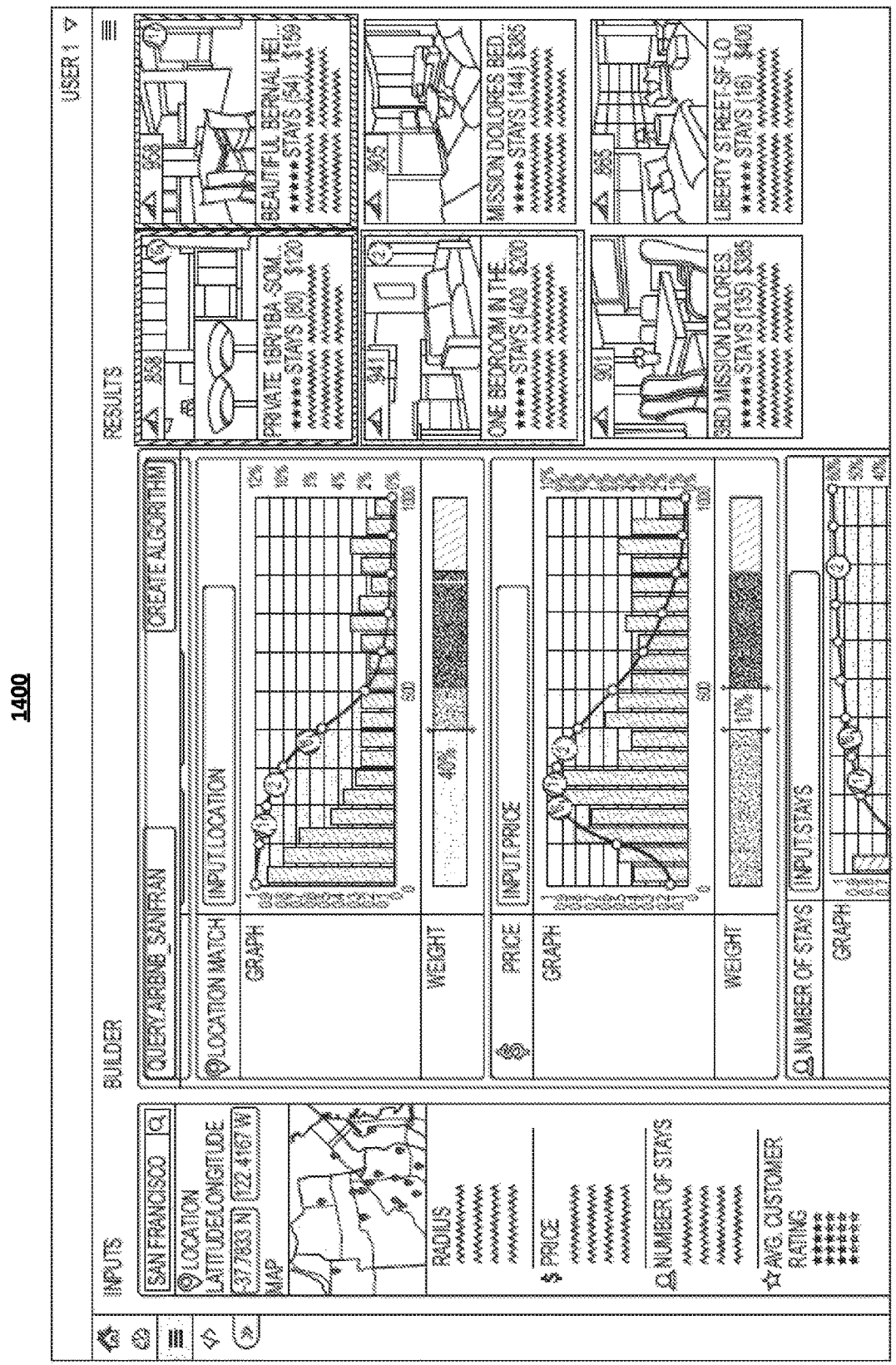

Then, as shown in FIGS. 13 and 14, for example, if the user thought that the $6^{th}$ result 1330 (i.e., the results shown in the bottom right corner of the "results" section) was the best for the "San Francisco" search, the user may manually interact with the interface by dragging this result from the $6^{th}$ position and placing it in the $1^{st}$ position (as shown in FIG. 14). This curation may become part of the algorithm (e.g., as an exception to the algorithm, or alternatively, by adding new factors and updating the algorithm to obtain this positioning of the results) and the user may be visually cued that the change had taken place. In particular embodiments, this may be useful when the user wants to "fix" the search algorithm by adding certain exceptions (e.g., by moving the $6^{th}$ result to the $1^{st}$ result) to react/update in real time to certain search queries or "debug" the results without algorithmically determining how to obtain such a result in the list of results.

As shown in FIG. 15, particular embodiments include one-click algorithm creation. Once the user is happy with an algorithm variant, as described above, they simply click one button and that variant becomes available for use, as shown in FIG. 15 that illustrates the updated results (as compared with FIG. 7). An algorithm id is created and client code or queries can immediately use that algorithm by passing that id into the search engine.

In particular embodiments, there may be a one-to-one correspondence between the interface and the underlying code/database. For example, cards (e.g., comprising factors or expressions) in the interface may each correspond to a line of query language code, and each line of query language code may correspond to a bytecode (i.e., a set of instructions) produced by the query planner as part of the result iterator.

Systems and Methods

Figure 16:
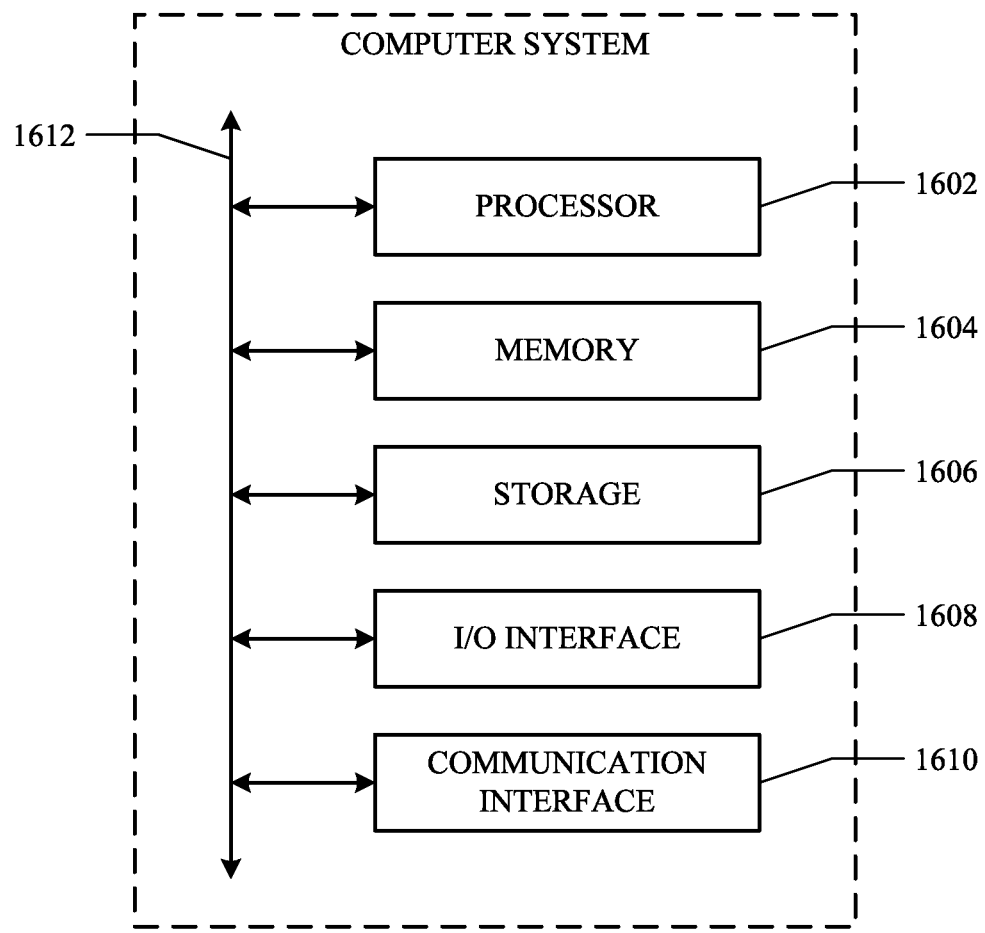
FIG. 16 illustrates an example computer system.

FIG. 16 illustrates an example computer system 1600. In particular embodiments, one or more computer systems 1600 perform one or more steps of one or more methods described or illustrated herein. In particular embodiments, one or more computer systems 1600 provide functionality described or illustrated herein. In particular embodiments, software running on one or more computer systems 1600 performs one or more steps of one or more methods described or illustrated herein or provides functionality described or illustrated herein. Particular embodiments include one or more portions of one or more computer systems 1600. Herein, reference to a computer system may encompass a computing device, and vice versa, where appropriate. Moreover, reference to a computer system may encompass one or more computer systems, where appropriate.

This disclosure contemplates any suitable number of computer systems 1600. This disclosure contemplates computer system 1600 taking any suitable physical form. As example and not by way of limitation, computer system 1600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1600 may include one or more computer systems 1600; be unitary or distributed; span multiple locations; span multiple machines; span multiple data centers; or reside in a cloud, which may include one or more cloud components in one or more networks. Where appropriate, one or more computer systems 1600 may perform without substantial spatial or temporal limitation one or more steps of one or more methods described or illustrated herein. As an example and not by way of limitation, one or more computer systems 1600 may perform in real time or in batch mode one or more steps of one or more methods described or illustrated herein. One or more computer systems 1600 may perform at different times or at different locations one or more steps of one or more methods described or illustrated herein, where appropriate.

In particular embodiments, computer system 1600 includes a processor 1602, memory 1604, storage 1606, an input/output (I/O) interface 1608, a communication interface 1610, and a bus 1612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1602 includes hardware for executing instructions, such as those making up a computer program. As an example and not by way of limitation, to execute instructions, processor 1602 may retrieve (or fetch) the instructions from an internal register, an internal cache, memory 1604, or storage 1606; decode and execute them; and then write one or more results to an internal register, an internal cache, memory 1604, or storage 1606. In particular embodiments, processor 1602 may include one or more internal caches for data, instructions, or addresses. This disclosure contemplates processor 1602 including any suitable number of any suitable internal caches, where appropriate. As an example and not by way of limitation, processor 1602 may include one or more instruction caches, one or more data caches, and one or more translation lookaside buffers (TLBs). Instructions in the instruction caches may be copies of instructions in memory 1604 or storage 1606, and the instruction caches may speed up retrieval of those instructions by processor 1602. Data in the data caches may be copies of data in memory 1604 or storage 1606 for instructions executing at processor 1602 to operate on; the results of previous instructions executed at processor 1602 for access by subsequent instructions executing at processor 1602 or for writing to memory 1604 or storage 1606; or other suitable data. The data caches may speed up read or write operations by processor 1602. The TLBs may speed up virtual-address translation for processor 1602. In particular embodiments, processor 1602 may include one or more internal registers for data, instructions, or addresses. This disclosure contemplates processor 1602 including any suitable number of any suitable internal registers, where appropriate. Where appropriate, processor 1602 may include one or more arithmetic logic units (ALUs); be a multi-core processor; or include one or more processors 1602. Although this disclosure describes and illustrates a particular processor, this disclosure contemplates any suitable processor.

In particular embodiments, memory 1604 includes main memory for storing instructions for processor 1602 to execute or data for processor 1602 to operate on. As an example and not by way of limitation, computer system 1600 may load instructions from storage 1606 or another source (such as, for example, another computer system 1600) to memory 1604. Processor 1602 may then load the instructions from memory 1604 to an internal register or internal cache. To execute the instructions, processor 1602 may retrieve the instructions from the internal register or internal cache and decode them. During or after execution of the instructions, processor 1602 may write one or more results (which may be intermediate or final results) to the internal register or internal cache. Processor 1602 may then write one or more of those results to memory 1604. In particular embodiments, processor 1602 executes only instructions in one or more internal registers or internal caches or in memory 1604 (as opposed to storage 1606 or elsewhere) and operates only on data in one or more internal registers or internal caches or in memory 1604 (as opposed to storage 1606 or elsewhere). One or more memory buses (which may each include an address bus and a data bus) may couple processor 1602 to memory 1604. Bus 1612 may include one or more memory buses, as described below. In particular embodiments, one or more memory management units (MMUs) reside between processor 1602 and memory 1604 and facilitate accesses to memory 1604 requested by processor 1602. In particular embodiments, memory 1604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1604 may include one or more memories 1604, where appropriate. Although this disclosure describes and illustrates particular memory, this disclosure contemplates any suitable memory.

In particular embodiments, storage 1606 includes mass storage for data or instructions. As an example and not by way of limitation, storage 1606 may include a hard disk drive (HDD), a floppy disk drive, flash memory, an optical disc, a magneto-optical disc, magnetic tape, or a Universal Serial Bus (USB) drive or a combination of two or more of these. Storage 1606 may include removable or non-removable (or fixed) media, where appropriate. Storage 1606 may be internal or external to computer system 1600, where appropriate. In particular embodiments, storage 1606 is non-volatile, solid-state memory. In particular embodiments, storage 1606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1606 taking any suitable physical form. Storage 1606 may include one or more storage control units facilitating communication between processor 1602 and storage 1606, where appropriate. Where appropriate, storage 1606 may include one or more storages 1606. Although this disclosure describes and illustrates particular storage, this disclosure contemplates any suitable storage.

In particular embodiments, I/O interface 1608 includes hardware, software, or both, providing one or more interfaces for communication between computer system 1600 and one or more I/O devices. Computer system 1600 may include one or more of these I/O devices, where appropriate. One or more of these I/O devices may enable communication between a person and computer system 1600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1608 for them. Where appropriate, I/O interface 1608 may include one or more device or software drivers enabling processor 1602 to drive one or more of these I/O devices. I/O interface 1608 may include one or more I/O interfaces 1608, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1600 and one or more other computer systems 1600 or one or more networks. As an example and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1610 for it. As an example and not by way of limitation, computer system 1600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1600 may include any suitable communication interface 1610 for any of these networks, where appropriate. Communication interface 1610 may include one or more communication interfaces 1610, where appropriate. Although this disclosure describes and illustrates a particular communication interface, this disclosure contemplates any suitable communication interface.

In particular embodiments, bus 1612 includes hardware, software, or both coupling components of computer system 1600 to each other. As an example and not by way of limitation, bus 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1612 may include one or more buses 1612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for minimizing latency of a query load on a database system by accessing data using an adaptive B-tree index structure comprising a plurality of nodes, the method comprising:
   by a computing device of the database system, determining one or more characteristics of the query load that are associated with one or more queries received by the database system;
   by the computing device, determining, for each of the plurality of nodes of the adaptive B-tree index structure, whether to convert the node to a read-optimized node or a write-optimized node based on the one or more characteristics of the query load; and
   by the computing device, converting at least one of the plurality of nodes to a read-optimized node or a write-optimized node based on the one or more characteristics of the query load, wherein converting the node to a read-optimized node comprises:
      determining an amount of a fan-out and a size of a buffer associated with the node;
      increasing the amount of the fan-out associated with the node; and
      decreasing the size of the buffer associated with the node.

2. The method of claim 1, wherein whether to convert the node to a read-optimized node or a write-optimized node is automatically determined by the database system based on the one or more characteristics of the query load.

3. The method of claim 1, wherein the determining of the one or more characteristics of the query load that are associated with one or more queries received by the database system comprises:
   determining whether the query load includes one or more read-actions or one or more write-actions; and
   determining, for a particular node, whether the particular node has received a read-action or one or more of the write-actions.

4. The method of claim 3, wherein when it is determined that the particular node has received a read-action, the method further comprises:

accessing a diffusion probability associated with the read-action to determine whether the particular node has been triggered to be adjusted to a read-optimized node; and adjusting the particular node to a read-optimized node if triggered.

5. The method of claim 3, wherein when it is determined that the particular node has received one or more of the write-actions, the method further comprises:

accessing a diffusion probability associated with each of the write-actions to determine whether the particular node has been triggered to be adjusted to a write-optimized node, and whether the particular node has been triggered more than once to be adjusted to a write-optimized node; and adjusting the particular node to a write-optimized node if triggered and based on the number of times triggered.

6. The method of claim 3, wherein determining the one or more characteristics of the query load that are associated with one or more queries received by the database system further comprises one or more of:

determining an absolute number of each of read-actions and write-actions associated with the particular node;

determining a ratio between a number of read-actions and a number of write-actions associated with the particular node;

determining a total volume of queries associated with the database system; or determining a size of data associated with each read-action and write-action.

7. The method of claim 1, wherein converting the node to a write-optimized node comprises:

determining an amount of a fan-out and a size of a buffer associated with the node;

decreasing the amount of the fan-out associated with the node; and increasing the size of the buffer associated with the node.

8. The method of claim 7, wherein when it is determined that the size of the buffer is smaller than half the size of the node, the method may comprise removing the buffer and adjusting the node to a completely un-buffered state.

9. One or more computer-readable non-transitory storage media embodying software that is operable when executed to:

determine one or more characteristics of a query load on a database system that are associated with one or more queries received by the database system;

determine, for each of a plurality of nodes of an adaptive B-tree index structure of the database system, whether to convert the node to a read-optimized node or a write-optimized node based on the one or more characteristics of the query load; and convert at least one of the plurality of nodes to a read-optimized node or a write-optimized node based on the one or more characteristics of the query load, wherein converting the node to a read-optimized node comprises:

determining an amount of a fan-out and a size of a buffer associated with the node;

increasing the amount of the fan-out associated with the node; and decreasing the size of the buffer associated with the node.

10. The media of claim 9, wherein whether to convert the node to a read-optimized node or a write-optimized node is automatically determined by the database system based on the one or more characteristics of the query load.

11. The media of claim 9, wherein the determining of the one or more characteristics of the query load that are associated with one or more queries received by the database system comprises:

determining whether the query load includes one or more read-actions or one or more write-actions; and determining, for a particular node, whether the particular node has received a read-action or one or more of the write-actions.

12. The media of claim 11, wherein when it is determined that the particular node has received a read-action, the method further comprises:

accessing a diffusion probability associated with the read-action to determine whether the particular node has been triggered to be adjusted to a read-optimized node; and adjusting the particular node to a read-optimized node if triggered.

13. The media of claim 11, wherein when it is determined that the particular node has received one or more of the write-actions, the method further comprises:

accessing a diffusion probability associated with each of the write-actions to determine whether the particular node has been triggered to be adjusted to a write-optimized node, and whether the particular node has been triggered more than once to be adjusted to a write-optimized node; and adjusting the particular node to a write-optimized node if triggered and based on the number of times triggered.

14. The media of claim 11, wherein determining the one or more characteristics of the query load that are associated with one or more queries received by the database system further comprises one or more of:

determining an absolute number of each of read-actions and write-actions associated with the particular node;

determining a ratio between a number of read-actions and a number of write-actions associated with the particular node;

determining a total volume of queries associated with the database system; or determining a size of data associated with each read-action and write-action.

15. The media of claim 9, wherein converting the node to a write-optimized node comprises:

determining an amount of a fan-out and a size of a buffer associated with the node;

decreasing the amount of the fan-out associated with the node; and increasing the size of the buffer associated with the node.

16. The media of claim 9, wherein when it is determined that the size of the buffer is smaller than half the size of the node, the method may comprise removing the buffer and adjusting the node to a completely un-buffered state.

17. A database system comprising:

an adaptive B-Tree structure for accessing data stored on the memory, wherein the adaptive B-Tree structure comprising a plurality of nodes;

one or more processors; and memory coupled to the processors comprising instructions executable by the processors that are operable when executing the instructions to:

determine one or more characteristics of the query load that are associated with one or more queries received by the database system;

determine, for each of the plurality of nodes of the adaptive B-tree index structure, whether to convert the node to a read-optimized node or a write-optimized node based on the one or more characteristics of the query load; and convert at least one of the plurality of nodes to a read-optimized node or a write-optimized node based on the one or more characteristics of the query load, wherein converting the node to a read-optimized node comprises:

determining an amount of a fan-out and a size of a buffer associated with the node;

increasing the amount of the fan-out associated with the node; and decreasing the size of the buffer associated with the node.

18. The system of claim 17, wherein whether to convert the node to a read-optimized node or a write-optimized node is automatically determined by the database system based on the one or more characteristics of the query load.

\* \* \* \* \*